(12) United States Patent
Kakutani

(10) Patent No.: US 7,164,503 B2
(45) Date of Patent: Jan. 16, 2007

(54) IMAGE-PROCESSING APPARATUS, PRINT CONTROL APPARATUS, IMAGE-PROCESSING METHOD, AND RECORDING MEDIUM

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1240 days.

(21) Appl. No.: 09/967,880

(22) Filed: Sep. 28, 2001

(65) Prior Publication Data
US 2002/0089685 A1 Jul. 11, 2002

(30) Foreign Application Priority Data
Oct. 6, 2000 (JP) .............................. 2000-308013
Aug. 6, 2001 (JP) .............................. 2001-238117

(51) Int. Cl.
*H04N 1/40* (2006.01)
*G06T 5/00* (2006.01)

(52) U.S. Cl. ...................................... 358/3.03; 382/252

(58) Field of Classification Search ...... 358/3.03–3.05, 358/1.9; 382/252
See application file for complete search history.

(56) References Cited

U.S. PATENT DOCUMENTS

| | | |
|---|---|---|
| 4,654,721 A | 3/1987 | Goertzel et al. |
| 5,008,950 A | 4/1991 | Katayama et al. |

FOREIGN PATENT DOCUMENTS

| | | |
|---|---|---|
| EP | 0474985 A2 | 3/1992 |
| EP | 0631428 A2 | 12/1994 |
| JP | 63-288565 A | 11/1988 |
| JP | 05-37775 A | 2/1993 |
| JP | 06-30274 A | 2/1994 |
| JP | 07-231387 A | 8/1995 |
| JP | 08-65511 A | 3/1996 |
| JP | 2621865 B | 4/1997 |
| JP | 10-084472 A1 | 3/1998 |
| JP | 10-271331 A | 10/1998 |
| JP | 2000-22944 | 1/2000 |

*Primary Examiner*—Scott A. Rogers
(74) *Attorney, Agent, or Firm*—Beyer,Weaver & Thomas LLP.

(57) ABSTRACT

A specific number of adjacent pixels are combined into blocks. The tone values of the pixels in a target block are detected when the dot on-off state is determined, and the fact that the target block does or does not satisfy specific processing conditions is confirmed based on the relation between the magnitudes of the tone values thus detected. The dot on-off state is determined for the target block in block units if the target block satisfies the processing conditions. The conversion procedure can be rapidly performed by adopting this approach. The dot on-off state is determined for the pixels of the target block if the processing conditions are not satisfied. Image quality is thereby prevented from being adversely affected. Image quality can thus be preserved and image data rapidly converted to a specific expression format based on the dot on-off state by performing the conversion procedure in accordance with an appropriate method selected based on whether the processing conditions are satisfied.

33 Claims, 17 Drawing Sheets

IMAGE-PROCESSING APPARATUS, PRINT CONTROL APPARATUS, IMAGE-PROCESSING METHOD, AND RECORDING MEDIUM

BACKGROUND OF INVENTION

1. Field of the Invention

The present invention relates to a technique of converting tone image data into a form expressed by the dot on-off state, and more particularly to a technique for the rapid conversion of image data with sustained quality.

2. Description of the Related Art

Image display apparatus in which images can be created by the formation of dots on display media such as print media or liquid-crystal screens are widely used as the output devices of various types of image-output equipment. The operation of such image display apparatus is limited to the creation of images by dots formed locally, but images with continuously varying its tones can be created by appropriately controlling the formation density of dots in accordance with the tone values of the images.

A method referred to as an error diffusion technique is widely used for these image display apparatus in order to determine the dot on-off state at each pixel so that the dots are formed with in a density adequately selected in accordance with the tone values of the image. The error diffusion technique is a method whereby the binarization errors generated by deciding the dot on-off state at a target pixel are diffused among the unconverted pixels on the periphery of the target pixel, the result is stored, and the dot on-off state is determined such that the errors diffused from the peripheral pixels are eliminated when the dot on-off state is determined for the unconverted pixels. Thus, the formation of dots whose density is sufficient to conform to the tone value of an image can be ascertained by determining the dot on-off state in a manner that allows the binarization errors generated by the peripheral pixels to be eliminated.

Using the error diffusion technique makes it possible to create high-quality images because dots are formed at an optimum density suitable for the tone image data, but because the tone errors must be diffused among peripheral pixels every time the dot on-off state is determined, processing time increases and rapid image expression becomes difficult to accomplish with an increase in the number of pixels in the images. To address these problems, techniques have been proposed in which a specific number of adjacent pixels is combined into a block, and the dot on-off state is determined while the errors are diffused from this block to adjacent blocks (see, for example, JP2000-22944A). Determining the dot on-off state in block units in such a manner allows processing to be completed in a short time and images to be rapidly displayed even when a larger number of pixels is to be processed.

Such methods are disadvantageous, however, in the sense that the quality of displayed images tends to be adversely affected when these methods are used. This is attributed to the fact that determining the dot on-off state in block units obtained by combining a specific number of pixels amounts to reducing image resolution and tends to reduce image quality in proportion to the reduction in resolution.

An purpose of the present invention, which was perfected in order to address the above-described problems of the prior art, is to provide a technique that allows images to be rapidly converted to an expression format based on the dot on-off state while preserving image quality.

SUMMARY OF THE INVENTION

The image-processing apparatus of the present invention is configured in the following manner in order to provide at least a partial solution to the aforementioned problems.

Specifically, the present invention primarily resides in an image-processing apparatus that determines dot on-off state for each pixel by taking into account a tone value of the pixel, and converts image data expressed by the tone value of each pixel into a specific expression format based on the dot on-off state, said image-processing apparatus comprising:

a block formation unit that combines a specific number of adjacent pixels into blocks, and identifies the block which includes the pixel for which the dot on-off state is to be formed as a target block;

a processing condition confirmation unit that detects the tone value of the each pixel included in the target block, and confirms that the target block satisfies a specific processing condition based on the detected tone values;

a first image data conversion unit that converts the image data for the target block into the specific expression format in block units;

a second image data conversion unit that converts the image data of each pixel included in the target block into the specific expression format;

an activation unit that activates one of said first image conversion unit and said second image conversion unit according to a result obtained by said processing condition confirmation unit; and an error diffusion unit that diffuses tone errors, which arise in the converted pixels due to the image data conversion, among unconverted pixels located peripherally of the converted pixel.

In addition, the inventive image-processing method, which corresponds to the image-processing apparatus described above, is primarily an image-processing method that determines dot on-off state for each pixel by taking into account a tone value of the pixel, and converts image data expressed by the tone value of each pixel into a specific expression format based on the dot on-off state, said image-processing method comprising:

a step of combining a specific number of adjacent pixels into blocks;

a step of identifying the block which includes the pixel for which the dot on-off state is to be formed as a target block;

a step of detecting the tone value of the each pixel included in the target block;

a step of converting the image data for the target block into the specific expression format in block units, when the target block satisfies a specific processing condition based on the detected tone values;

a step of converting the image data of each pixel included in the target block into the specific expression format, when the target block dose not satisfy the specific processing condition based on the detected tone values; and a step of diffusing tone errors, which arise in the converted pixels due to converting the image data, among unconverted pixels located peripherally of the converted pixel.

The above-described image-processing apparatus and method are such that when the dot on-off state is determined for each of the pixels constituting a target block, the tone values of the pixels in the target block, and the fact that the target block does or does not satisfy specific processing conditions is confirmed based on the magnitude of the tone values thus identified. Although tone values obtained by diffusing the tone errors from peripheral pixels are identified herein as the tone values of pixels, tone values existing prior to the diffusion of tone errors may also be conveniently used. The image data are converted in block units into an expression format determined by the dot on-off state for the target blocks thus confirmed to satisfy specific processing conditions. Such conversion of data in block units can speed up the conversion process in a proportional manner. Conversion of data to an expression format determined by the dot on-off state is performed for each of the pixels constituting the target blocks thus confirmed to unsatisfy specific processing conditions. Conversion of image data for each pixel makes it possible to preserve high image quality. It is thus possible to rapidly determine the dot on-off state while preserving image quality by converting image data in accordance with an appropriate method selected based on whether the target blocks satisfy specific processing conditions.

An optional feature of the image-processing apparatus is that a sum of tone values is calculated for the pixels of a target block, and the fact that specific processing conditions are satisfied is confirmed if the sum is less than a specific threshold value.

Because a block with a small sum is deemed to have a minor effect on image quality, image data can be rapidly converted without adversely affecting image quality by a process in which it is confirmed that specific processing condition are satisfied and that dots have or have not been formed in each block when the total value for target blocks is less than a specific threshold value. In addition, the total value for the target blocks can be easily calculated, making it possible to readily convert whether the target blocks satisfy specific processing conditions by performing the conversion procedure on the basis of the total value. This approach is therefore preferred because the dot on-off state can be rapidly determined. It is apparent that a mean value obtained by averaging the tone values of pixels may also be used instead of the total tone value of the pixels in a target block.

Tone values obtained by taking into account the tone errors diffused among pixels are used to determine the sum. Because the dot on-off state is commonly determined based on tone values obtained by taking into account tone errors diffused from peripheral pixels, image data conversion methods can be classified more appropriately by determining the total value on the basis of such tone values. Tone values obtained without the diffusion of tone errors can also be conveniently used.

The image-processing apparatus thus configured may also confirm that a target block does not satisfy specific processing conditions, and the dot on-off state in each pixel can also be determined if there are pixels for which the difference between the tone values of two adjacent pixels in the target block exceeds a specific value.

The image-processing apparatus thus configured may also confirm that a target block does not satisfy specific processing conditions, and determine the dot on-off state in each pixel if the difference between the maximum and minimum tone values in the target block exceeds a specific value.

The difference of the tone values between pixels tends to be large in image areas with outline segments. In view of this, the above-described method is preferred because it allows image data to be adequately converted without adversely affecting the resolution of outline segments by confirming whether or not the target block corresponds to an outline segment and determining the dot on-off state in the absence of such a correspondence. Although tone values obtained by diffusing the tone errors from peripheral pixels are used for the conversion procedure, tone values existing prior to the diffusion of tone errors may also be conveniently used.

The image-processing apparatus thus configured may also operate such that the dot on-off state is determined in target block units for the pixels of a target block that satisfies specific processing conditions, and the tone errors identified with the pixels as a result of the conversion procedure are diffused among the unconverted pixels of a block adjacent to the target block.

This approach is preferred because when the dot on-off state in target blocks is determined in block units, the dot on-off state can be determined more rapidly than when the conversion procedure is performed in each pixel.

The image-processing apparatus thus configured may also calculate a sum of tone values for all the pixels of a target block, and determine that dots are to be formed for pixels whose number is specified in accordance with this sum when the dot on-off state is determined in block units.

This approach allows the dot on-off state to be rapidly determined for target blocks. Another beneficial feature of this approach is that dots can be formed for an entire target block in a density appropriately selected in accordance with the tone value of each pixel. Although tone values obtained by diffusing the tone errors from peripheral pixels can be used as the tone values of pixels, tone values existing prior to the diffusion of errors may also be conveniently used.

The image-processing apparatus thus configured may also determine that dots are to be formed for pixels at specific locations in a target block in accordance with the sum when the dot on-off state is determined in block units.

This approach is preferred because when a specific number of dots is to be formed for each of the pixels constituting a target block, determining in advance the pixel positions at which the dots are to be formed makes it possible to accelerate the procedure employed to form the specific number of dots in the target block.

The image-processing apparatus thus configured may also determine that dots are to be formed for a specific number of pixels in order from the pixels with larger tone values in a target block when the dot on-off state is determined in block units.

This approach is preferred because forming dots in order from higher tone values makes it possible to determine the dot on-off state for each of the pixels of a target block and to form dots for the pixels appropriately selected in accordance with the tone values of each pixel. Although tone values obtained by diffusing tone errors can be used in this case, tone values existing prior to the diffusion of the tone errors may also be conveniently used.

In the image-processing apparatus thus configured, the positions of dot-forming pixels in a target block may be selected each time, and dot formation may be determined for a specific number of pixels.

This approach is preferred because there is no risk that image quality will be adversely affected by the ordered formation of dots in a series of target blocks each of which is to be provided with a specific number of dots selected in accordance with the aforementioned sum.

The image-processing apparatus thus configured may also determine that no dots are to be formed for the pixels of a target block if the aforementioned sum is less than a specific value.

This approach is preferred because the dot on-off state in a target block can be rapidly determined merely by presetting an appropriate specific value.

In the image-processing apparatus thus configured, the dot on-off state may also be determined in block units in the following manner. A sum of tone values is calculated for the pixels of a target block without taking into account the diffused tone errors. Tone errors diffused to a block that follows a series of target blocks are initialized if the each sum for the series of blocks is subsequently equal to zero.

If the summed tone value within a target block consistently remains at zero level, the corresponding area is deemed to be devoid of the intended image. Consequently, this approach is preferred because situations in which dots may be formed in image-free areas because of diffused tone errors are prevented by initializing the tone errors diffused between the target blocks on the downstream side.

The claimed image-processing apparatus and image-processing method also allow the dot on-off state in target blocks to be determined in block units in the following manner. Specifically, a summated error may be calculated by totaling the tone errors diffused among the pixels of a target block, and the resulting summated error may be diffused among the pixels of the target block in accordance with a specific method.

This approach is preferred because adopting a blockwise approach for diffusing the tone errors among the pixels of a target block accelerates the diffusion process in comparison with the individual diffusion of errors among block pixels, making it possible to rapidly convert the image data in the target blocks.

The image-processing apparatus thus configured may also operate such that a summated error is diffused among the pixels of a target block in a specific ratio when the tone errors are diffused among the pixels of the target block in block units.

This approach is preferred because presetting the ratio in which the summated error is diffused among the pixels of a block allows diffusion errors to be rapidly diffused among the pixels of the target block, making it possible to achieve a proportional increase in the speed with which the image data can be converted.

The image-processing apparatus thus configured may also operate such that all the tone errors for each of the pixels can be collectively diffused to a pixel disposed at a specific location in the target block when the tone errors are diffused among the pixels of the target block in block units.

This approach is preferred because handling all the tone errors for the pixels of a target block as an error that can be collectively diffused among the pixel disposed at a specific location in the target block allows the tone errors to be diffused at a high rate, making it possible to achieve an increase in the speed with which the image data is converted. Further, the total error of the target block may conveniently be diffused among plural pixels disposed at specific locations.

The above-described image-processing apparatus also allows the dot on-off state in target blocks to be determined in block units in the following manner. Specifically, image data are converted in block units by a method in which the dot on-off state in each pixel is determined while the tone errors generated by the pixels of a target block are diffused among the unconverted pixels of a block adjacent to the target block.

Image data can thus be converted with high image quality because of diffusing the tone errors by determining the dot on-off state of the pixels in the target block. It is also possible to rapidly determine the dot on-off state in the target block by limiting the tone errors to the block. Ultimately, this approach is preferred because image data can be rapidly converted without a reduction in image quality of the target block.

The claimed image-processing apparatus and image-processing method also allow the dot on-off state in target blocks to be determined in block units in the following manner. Specifically, a block error may be calculated by totaling the tone errors identified with the pixels of a target block by determining the dot on-off state, and the resulting block error may be diffused among the unconverted pixels of a block adjacent to the target block.

The method in which the tone errors diffused among the pixels of a block adjacent to the target block are collectively diffused in block units can thus yield accelerated diffusion in comparison with a case in which the errors are diffused individually among the pixels of the adjacent block. As a result, this approach is preferred because image data can be rapidly converted to an expression format determined by the dot on-off state.

The image-processing apparatus thus configured may also operate such that the block error is calculated based on the results obtained by determining the dot on-off state for the pixels of a target block, and on the summed tone value of the pixels prior to the diffusion of the tone errors from the adjacent block.

This approach is preferred because the tone errors do not need to be determined for each of the pixels in a target block, making it possible to increase the speed with which the block error is calculated and the dot on-off state is determined.

The image-processing apparatus thus configured may also operate such that the block error is diffused in a specific ratio among the pixels in an adjacent block of a target block when the tone errors generated by the target block are diffused among the pixels of an adjacent block in block units.

This approach is preferred because the block error generated by a target block can be rapidly diffused among the pixels of an adjacent block.

Alternatively, the block error may be diffused among one or more pixels disposed at specific locations within the adjacent block.

This approach is preferred because presetting the pixel locations for diffusing the block error allows the procedure involved in diffusing the tone errors to be simplified, making it possible to achieve a proportional increase in the processing speed. The pixels disposed at the specific locations within the adjacent block may be one pixel, but the present invention is not limited to this option and allows the block error to be diffused among a plurality of pixels in a specific ratio.

The above-described image-processing apparatus may also be configured such that four pixels arranged in two rows and columns are combined to form a block.

Combining four pixels arranged in two rows and columns to form a block is preferred because the dot on-off state can be rapidly and easily determined with minimal deterioration in image quality by performing the conversion procedure without diffusing tone errors among the block pixels.

The image-processing apparatus of the present invention can be conveniently adapted to a print control apparatus whereby a print unit for forming ink dots on a print medium and printing an image is controlled by the output of print data designed to control dot formation. Specifically, the above-described image-processing apparatus is preferred because image data can be rapidly converted without any deterioration in image quality into an expression format based on the dot on-off state, so adapting the above-described image-processing apparatus to such a print control apparatus makes it possible to print high-quality images.

Another feature of the present invention is that a program for executing the above-described image-processing method can be read by a computer and executed by the computer. Consequently, the present invention includes an embodiment in the form of a recording medium. Specifically, the inventive recording medium for the above-described image-processing method primarily resides in a recording medium in which a program is recorded in a computer readable manner, said program actualizing a method that determines dot on-off state for each pixel by taking into account a tone value of the pixel, and converts image data expressed by the tone value of each pixel into a specific expression format based on the dot on-off state, said program causes a computer to execute:

a function of combining a specific number of adjacent pixels into blocks;

a function of identifying the block which includes the pixel for which the dot on-off state is to be formed as a target block;

a function of detecting the tone value of the each pixel included in the target block;

a function of converting the image data for the target block into the specific expression format in block units, when the target block satisfies a specific processing condition based on the detected tone values;

a function of converting the image data of each pixel included in the target block into the specific expression format, when the target block dose not satisfy the specific processing condition based on the detected tone values; and a function of diffusing tone errors, which arise in the converted pixels due to converting the image data, among unconverted pixels located peripherally of the converted pixel.

The recording medium thus configured may also store a computer-program designed to execute a function whereby it is concluded that a target block does not satisfy specific processing conditions when the difference between the maximum and minimum tone values in the target block exceeds a specific value during an operation aimed at determining whether the target block satisfies the specific processing conditions.

The recording medium thus configured may also store a computer-program so as to execute a function for converting image data in block units for a target block that satisfies specific processing conditions, namely a function whereby the dot on-off state is determined in target block units for the pixels of the target block, and a function whereby the tone errors identified with the pixels as a result of the conversion procedure are diffused among the unconverted pixels of a block adjacent to the target block.

The recording medium thus configured may also store a computer-program so as to execute a function for converting image data in block units for a target block that satisfies specific processing conditions, namely a function for determining the dot on-off state for the pixels of the target block, and a function for calculating the block error obtained by totaling the tone errors identified with the pixels of the target block as a result of the conversion procedure, and diffusing the resulting block error among the pixels for which the dot on-off state has not yet been determined and which are positioned in a block adjacent to the target block.

Image data can be rapidly converted without any deterioration in image quality into an expression format based on the dot on-off state by adopting an approach in which the program stored on the recording medium is read by a computer, and the aforementioned functions are executed by the computer.

The present invention can also be implemented as a program that allows the above-described image-processing methods to be executed by a computer. Specifically, the program designed for the aforementioned image-processing methods primarily resides in a program for actualizing a method that determines dot on-off state for each pixel by taking into account a tone value of the pixel, and converts image data expressed by the tone value of each pixel into a specific expression format based on the dot on-off state, said program causes a computer to execute:

a function of combining a specific number of adjacent pixels into blocks;

a function of identifying the block which includes the pixel for which the dot on-off state is to be formed as a target block;

a function of detecting the tone value of the each pixel included in the target block;

a function of converting the image data for the target block into the specific expression format in block units, when the target block satisfies a specific processing condition based on the detected tone values;

a function of converting the image data of each pixel included in the target block into the specific expression format, when the target block dose not satisfy the specific processing condition based on the detected tone values; and a function of diffusing tone errors, which arise in the converted pixels due to converting the image data, among unconverted pixels located peripherally of the converted pixel.

The claimed program may allow a computer to execute a function for converting image data in block units for a target block that satisfies specific processing conditions, namely a function whereby the dot on-off state is determined in target block units for the pixels of the target block, and a function whereby the tone errors generated identified with the pixels as a result of the conversion procedure are diffused among the unconverted pixels of a block adjacent to the target block.

Alternatively, the claimed program may allow a computer to execute a function for converting image data in block units for a target block that satisfies specific processing conditions, namely a function for determining the dot on-off state for the pixels of the target block, and a function for calculating the block error obtained by totaling the tone errors identified with the pixels of the target block as a result of the conversion procedure, and diffusing the resulting block error among the pixels for which the dot on-off state has not yet been determined and which are positioned in a block adjacent to the target block.

DESCRIPTION OF THE PREFERRED EMBODIMENT

Figure 1:
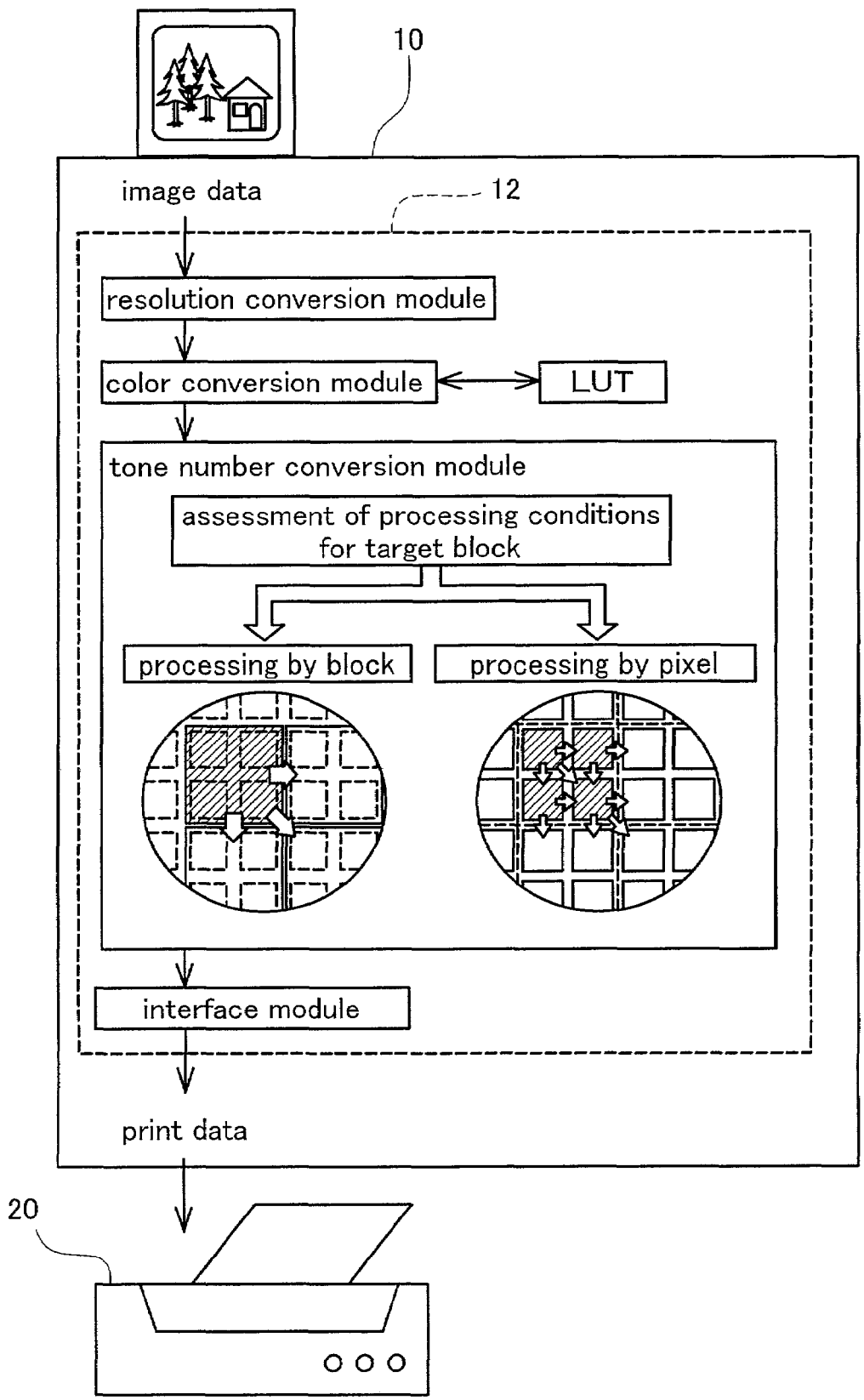
FIG. 1 is a schematic block diagram of a print system as an illustration of an embodiment of the present invention.

To further elucidate the operation and merits of the present invention, embodiments of the present invention will now be described in the following sequence.
A. Brief of Embodiments
B. Device Structure
C. Overview of Image data Conversion Procedure
D. Process of Converting Number of tones
　D-1. Processing of Highlighted Areas
　D-2. Processing of Transitional Highlighted Areas
　D-3. Processing of Areas Beyond Intermediate Tone Value
E. Modifications
　E-1. First Modification
　E-2. Second Modification
　E-3. Third Modification A. Brief of Embodiment A brief of embodiments about the present invention will now be described with reference to FIG. 1. FIG. 1 is a diagram illustrating a brief of embodiments about the present invention with reference to a print system. The print system comprises a computer 10 as the image-processing apparatus, a color printer 20, and the like. Upon receiving tone image data concerning RGB color images from a digital camera, color scanner, or other video device, the computer 10 converts these image data to print data that can be represented by the formation of color dots printable by the color printer 20. The print data are converted using a dedicated program referred to as "printer driver 12." The RGB tone image data can also be compiled by the computer 10 with the aid of various application programs.

The printer driver 12 comprises a plurality of modules, which include a resolution conversion module, a color conversion module, a tone number conversion module, and an interface module. The tone number conversion module converts the tone image data to an expression format based on the dot on-off state. The types of processing performed by the other modules will be described hereinbelow. The color printer 20 prints color images on a print medium by forming color-ink dots on the basis of the print data converted by the modules.

The tone number conversion module belonging to the print system of the present invention has a plurality of confirmation modes and operates to combine a specific number of pixels into blocks and to determine the dot on-off state in block units. Only two typical confirmation modes are schematically shown in connection with the tone number conversion module depicted in FIG. 1. The confirmation mode shown on the left side of the tone number conversion module in FIG. 1 is a mode in which no distinction is made among the pixels in a block, and the dot on-off state is determined by treating the target block as a large pixel. The confirmation mode shown on the right side of the tone number conversion module in FIG. 1 is a mode in which the dot on-off state is determined while the procedure is performed in block units and tone errors are diffused among the pixels of the target block. These confirmation modes will be described below. Processing conditions are confirmed at the start of target block processing, and the dot on-off state is determined using an appropriate confirmation mode in accordance with the confirmed processing condition. The confirmation method for the processing condition will be described in detail below.

With the tone number conversion module of the present invention, different confirmation modes are selected for different blocks when the dot on-off state is determined in block units in order to speed up the conversion procedure. It is therefore possible to speed up processing while preserving the image quality. Such an image-processing method will be described hereinbelow with reference to embodiments.

B. Device Structure

Figure 2:
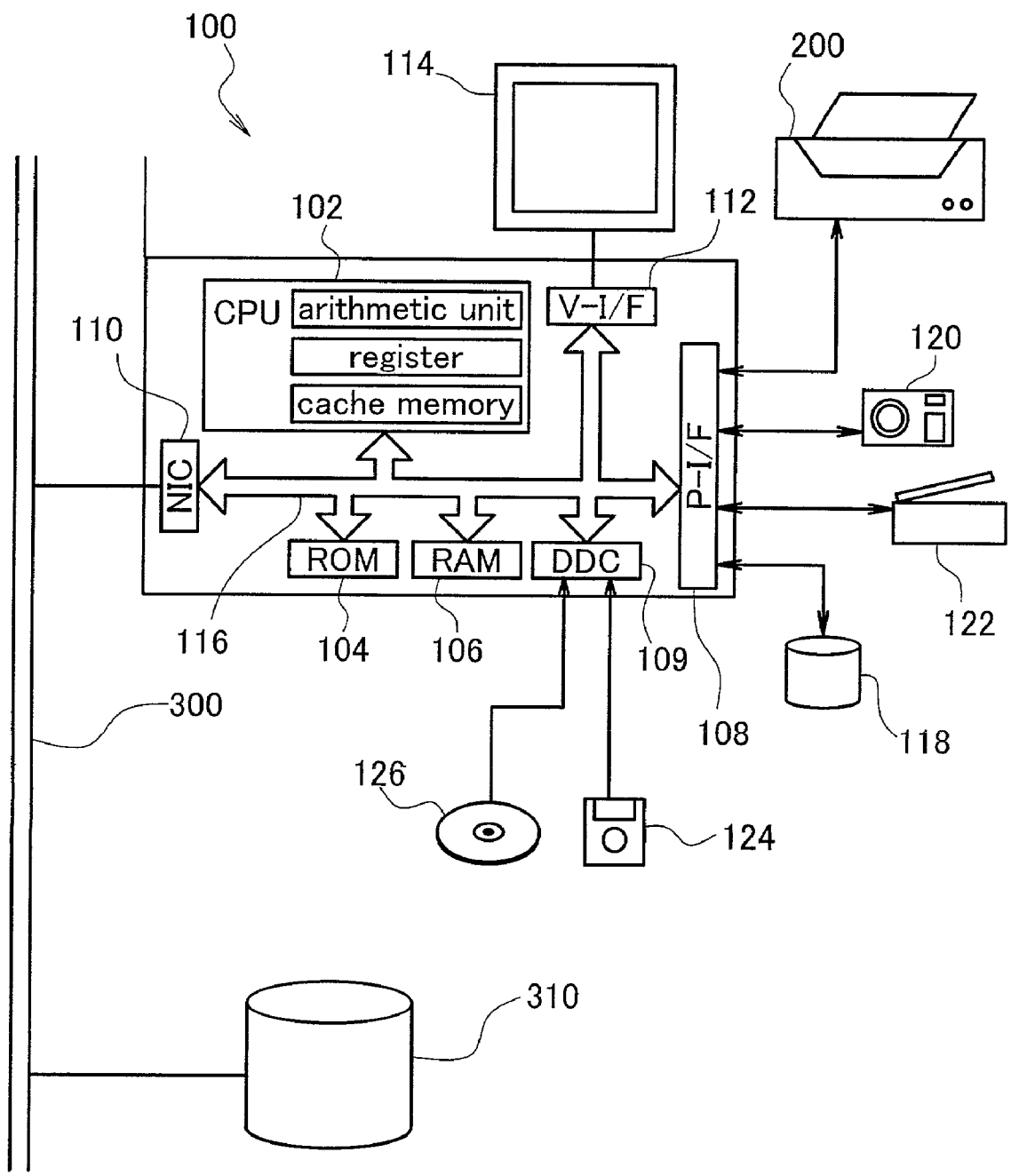
FIG. 2 is a diagram depicting the structure of a computer operating as the image-processing apparatus of an embodiment.

FIG. 2 is a diagram depicting the structure of a computer 100, which represents the image-processing apparatus of the present embodiment. The computer 100 is a commonly known computing device based on a CPU 102 and obtained by connecting a ROM 104, a RAM 106, and the like to each other with the aid of a bus 116.

The following components are connected to the computer 100: a disk controller DDC 109 for reading data from a flexible disk 124 or a compact disk 126, a peripheral equipment interface P-I/F 108 for exchanging data with peripheral equipment, a video interface V-I/F 112 for energizing a CRT 114, and the like. A color printer 200 (see below), a hard disk 118, and the like are connected to the P-I/F 108. Connecting a digital camera 120, the color scanner 122, or the like to the P-I/F 108 allows images captured by the digital camera 120 or color scanner 122 to be printed. In addition, installing a network interface card NIC 110 allows the computer 100 to be connected to a communications line 300, and the data stored by a storage device 310 (which is connected to the communications line) to be received.

Figure 3:
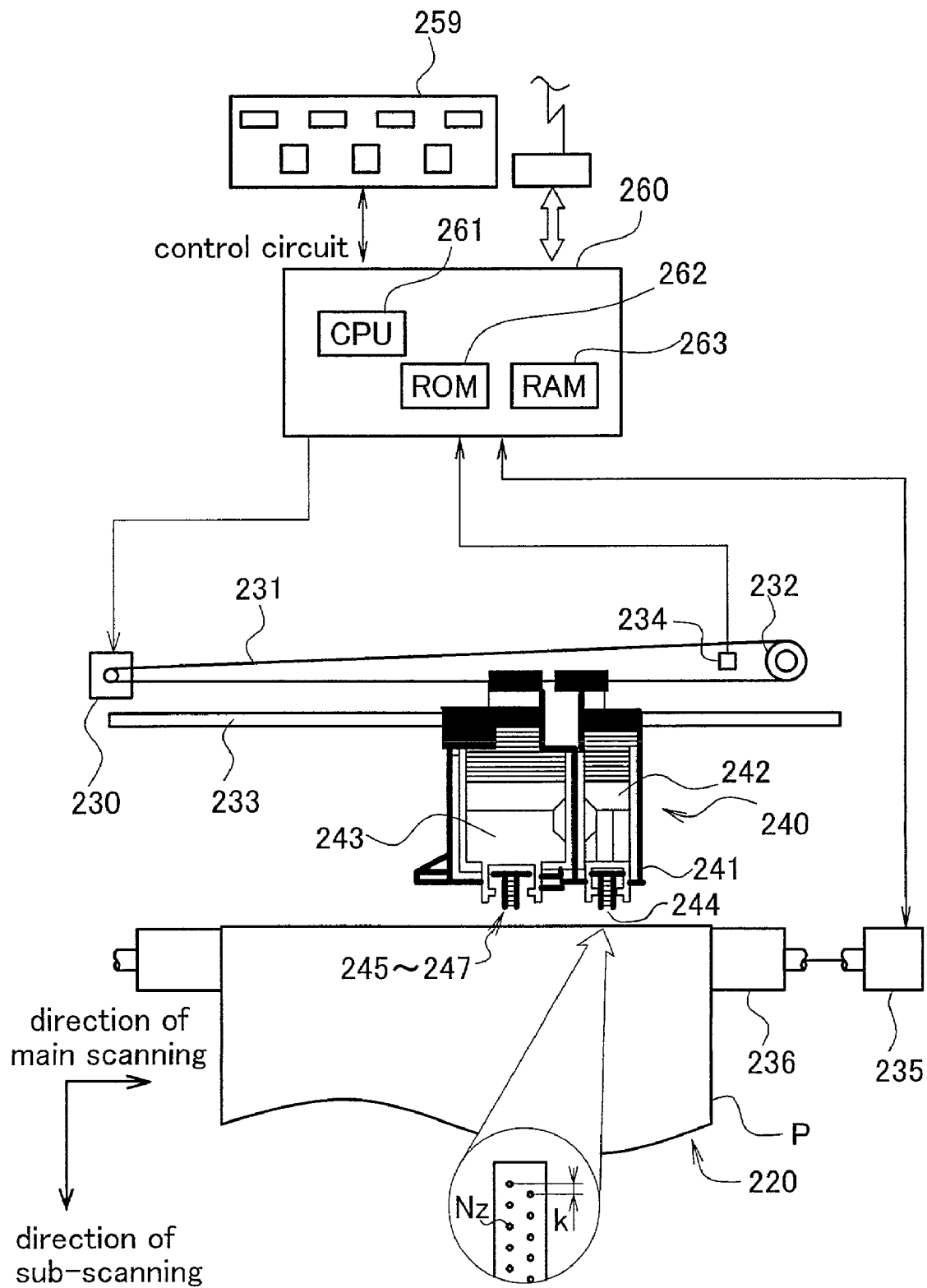
FIG. 3 is a schematic block diagram of a printer operating as the image-processing apparatus of the embodiment.

FIG. 3 is a diagram depicting the overall structure of the color printer 200 pertaining to a first embodiment. The color printer 200 is an ink-jet printer capable of forming ink dots of four colors: cyan, magenta, yellow, and black. It is also possible to use an ink-jet printer capable of forming ink dots in six colors, which include light cyan (produced by an ink with a low concentration of cyan dye) and light magenta (produced by an ink with a low concentration of magenta dye) in addition to the aforementioned four colors. Cyan ink, magenta ink, yellow ink, black ink, light cyan ink, and light magenta ink will occasionally be abbreviated hereinbelow as "C-ink," "M-ink," "Y-ink," "K-ink," "LC-ink," and "LM-ink," respectively.

The color printer 200 comprises a mechanism for ejecting the inks and forming dots by actuating a print head 241 mounted on a carriage 240 in the manner shown in the drawing, a mechanism for reciprocating the carriage 240 in the axial direction of a platen 236 by a carriage motor 230, a mechanism for transporting printing paper P by a paper feed motor 235, and a control circuit 260 for controlling the formation of dots, the movement of the carriage 240, and the transport of the printing paper.

Mounted on the carriage 240 are an ink cartridge 242 for storing K-ink, and an ink cartridge 243 for storing C-, M-, and Y-inks. When the ink cartridges 242 and 243 are mounted on the carriage 240, the inks from the cartridges are fed via supply tubes (not shown) to the color ink ejection heads 244 to 247 on the bottom surface of the print head 241. Each of the color ink ejection heads 244 to 247 is provided with a row of nozzles. The row consists of 48 nozzles Nz arranged at a constant nozzle pitch k.

The control circuit 260, which comprises a CPU 261, a ROM 262, a RAM 263, and the like, controls the main scans and sub-scans of the carriage 240 by controlling the operation of the carriage motor 230 and paper feed motor 235, and causes each nozzle to eject ink droplets with optimal timing on the basis of the print data supplied by the computer 100. The color printer 200 can thus print color images by forming ink dots of each color at appropriate positions on the print medium under control from the control circuit 260.

A variety of methods can be used to eject ink droplets from the ink-ejecting head of each color. Examples of such methods include those in which the ink is ejected using piezo-elements and those in which the ink is ejected as a result of the fact that bubbles are formed in an ink channel by a heater provided to this channel. It is also possible to use a printer operating on a principle that ink dots are formed on printing paper by means of thermal transfer or another phenomenon instead of ink injection, or that a toner powder of each color is fused onto printing paper by static electricity.

Alternatively, it is possible to use a so-called variable dot printer in which the size of ink dots on the printing paper can be controlled by controlling the size of the ink droplets being ejected, or by adopting a method in which a plurality of ink droplets are ejected at once, and the number of the ink droplets thus ejected is controlled.

In the color printer 200 with such a hardware structure, the ink ejection heads 244 to 247 of each color are advanced in the direction of main scanning in relation to the printing paper P by the carriage motor 230, and the printing paper P is advanced in the direction of sub-scanning by the paper feed motor 235. The color printer 200 prints color images on the printing paper as a result of the fact that the control circuit 260 actuates the nozzles with optimal timing and causes ink droplets to be ejected while repeatedly moving the carriage 240 in the direction of main and sub-scanning in accordance with print data.

C. Overview of Image Data Conversion Procedure

Figure 4:
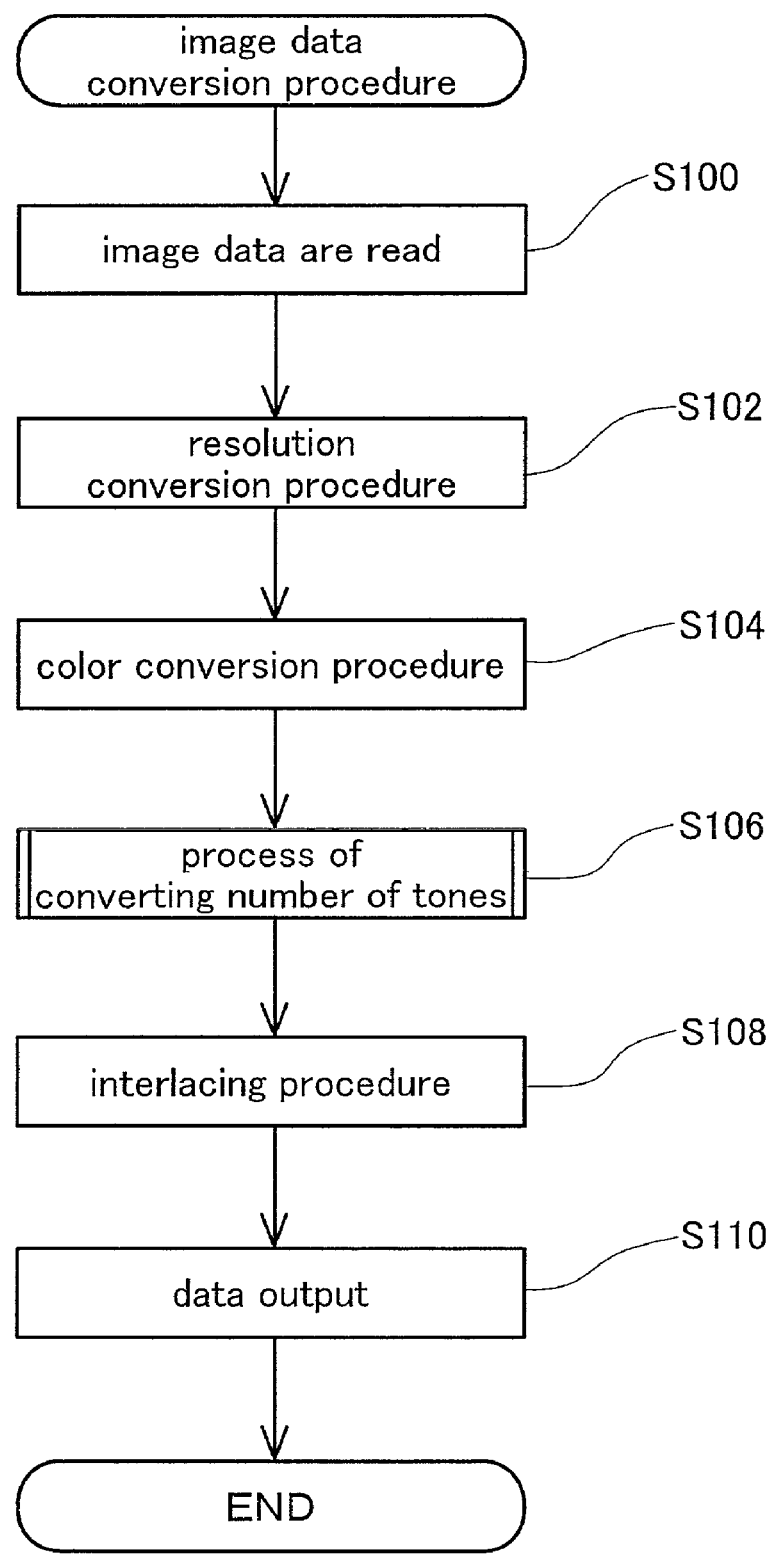
FIG. 4 is a flow chart depicting the progress of the image data conversion procedure performed by the image-processing apparatus of the present embodiment.

FIG. 4 is a flow chart of a procedure in which the computer 100, which is the image-processing apparatus of the present embodiment, converts image data to print data by applying a specific image processing routine to the image data received. The routine is started by allowing the operating system of the computer 100 to launch the printer driver 12. The image data conversion procedure of the present embodiment will be outlined with reference to FIG. 4.

When the image data conversion procedure is started, the printer driver 12 first reads the RGB color image data to be converted (step S100). The resolution of the image data thus received is then converted to a resolution suitable for printing with the color printer 200 (step S102). New data are generated between the adjacent packets of image data by performing linear interpolation if the resolution of the color image data is less than the print resolution, and, conversely, the resolution of the image data is converted to the print resolution by culling the data at a constant rate if the resolution of the color print data is less than the print resolution.

The color image data undergo a color conversion procedure (step S104) once the resolution has been converted in this manner. Color conversion is a procedure in which color image data expressed by a combination of R, G, and B tone values are converted to a type expressed by the tone values of the colors (C, M, Y, K, and the like) equipped on the color printer 200. The color conversion procedure can be rapidly performed by consulting a three-dimensional numerical table (color conversion table).

The printer driver 12 starts a process of converting number of tones (step S106) following the color conversion procedure. The process of converting number of tones is performed as follows. The RGB image data are converted to tone data for each of the colors C, M, Y, and K by the color conversion procedure. The packets of image data for these colors have 256 levels between the tone values of 0 and 255. By contrast, the color printer 200 of the present embodiment is limited to distinguishing between the state of "dot formation" and the state of "no dot formation." In view of this, the tone data representing each color and having 256 levels must be converted to image data expressed as the binarized data suitable for the color printer 200. The procedure for converting tone values in this manner is referred to as a process of converting number of tones. As will be described below, the printer driver 12 of the present embodiment is designed to perform high-speed processing and to preserve high image quality by combining specific numbers of pixels into blocks and performing the process of converting number of tones in block units to speed up processing and to determine the dot on-off state by a method appropriately selected in accordance with the tone data pertaining to block pixels.

The printer driver starts an interlacing procedure (step S108) once the process of converting number of tones is completed in this manner. The interlacing procedure is a routine in which image data presented in a format capable of expressing the dot on-off state are rearranged according to the transfer sequence used by the color printer 200 by taking into account the dot-formation sequence. The image data ultimately yielded by the interlacing procedure are sent by the printer driver 12 as print data to the color printer 200 (step S110). The color printer 200 forms ink dots of each color on the print medium in accordance with the print data. As a result, color images that correspond to the image data are printed on the print medium.

D. Process of Converting of Number of Tones

Figure 5:
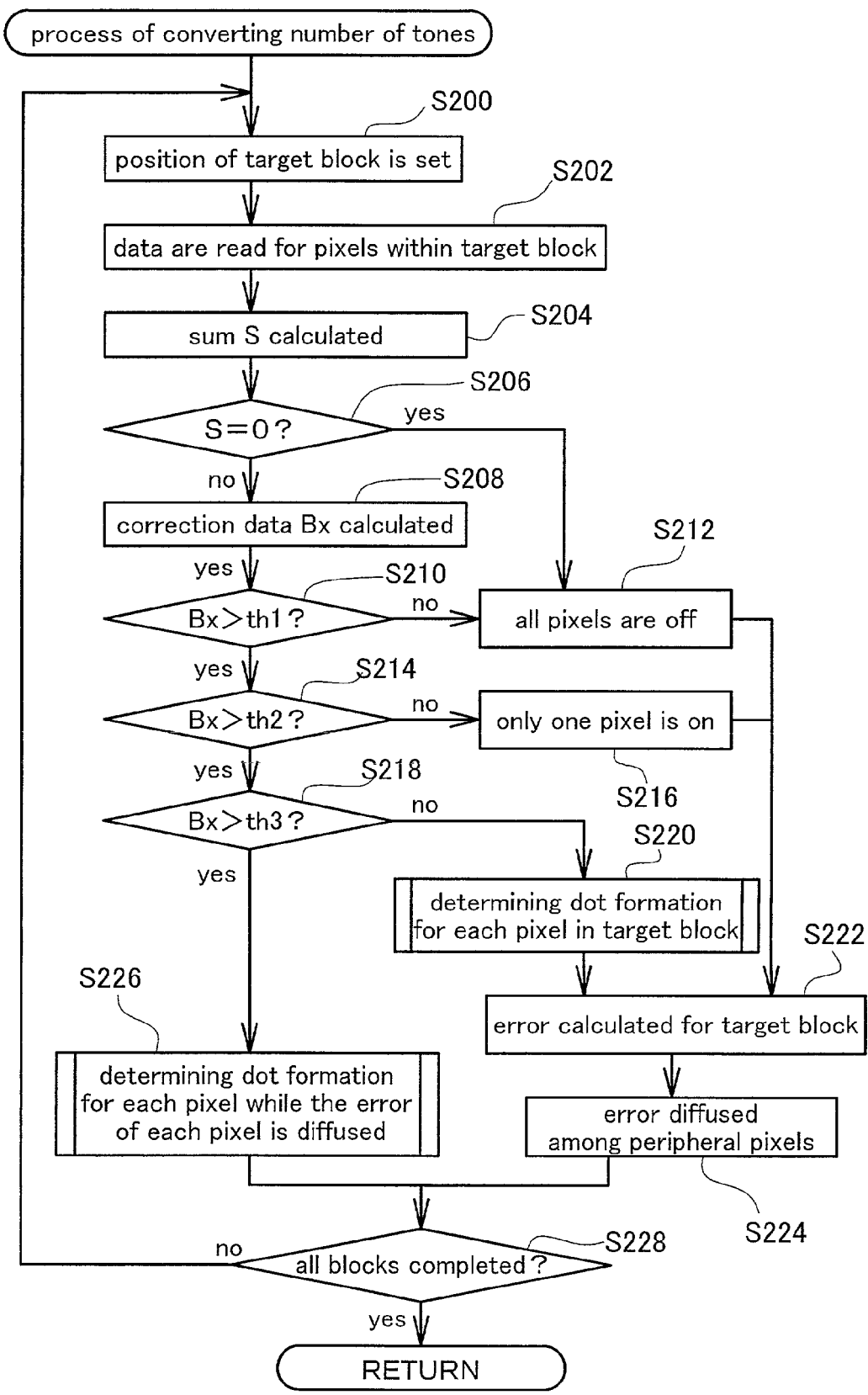
FIG. 5 is a flow chart depicting the progress of the process of converting number of tones performed in accordance with the present embodiment.

FIG. 5 is a flow chart depicting the progress of the process of converting number of tones pertaining to the present embodiment. The procedure is performed by the CPU 102 of the computer 100. The color printer 200 of the present embodiment is capable of forming ink dots of the four colors C, M, Y, and K in the above-described manner, and the process of converting number of tones shown in FIG. 5 is performed for each of these colors. For the sake of simplicity, the description that follows is given without reference to a specific color.

When the procedure is started, the block position is first set (step S200). Specifically, the process of converting number of tones of the present embodiment entails combining a specific number of adjacent pixels into blocks and determining the dot on-off state in block units, so the position of the target block for which the dot on-off state is to be determined is first set for the image.

Figure 6:
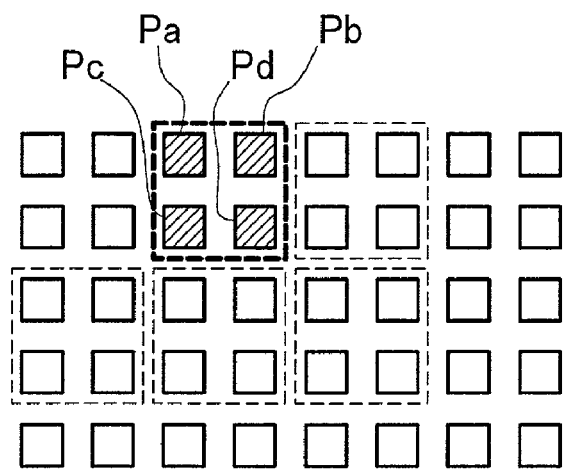
FIG. 6 is a diagram depicting the manner in which a target block is set.
Figure 7A:
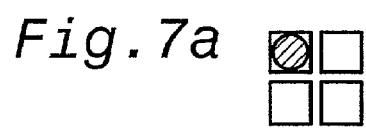
FIG. 7 is a diagram depicting the manner in which a dot is formed in only one of the pixels constituting a target block.
Figure 7B:
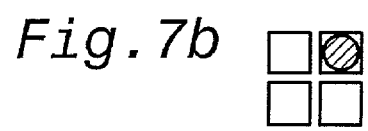
Figure 7C:
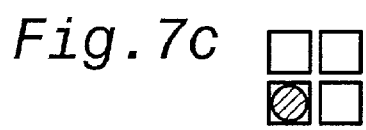
Figure 7D:
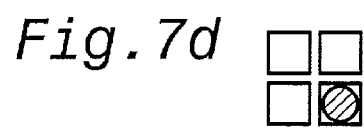

FIG. 6 is a diagram schematically depicting the manner in which the position of a target block in an image is set. The small squares shown in FIG. 6 are a schematic representation of pixels. An image is composed of a plurality of pixels arranged in a grid, as shown in FIG. 6. The thick dashed lines around groups of four pixels represent the target blocks selected in order to determine the dot on-off state. For the sake of convenience, the four pixels constituting a block will be distinguished by the use of Pa, Pb, Pc, and Pd for the upper left, upper right, lower left, and lower right pixels, respectively. Although the description that follows will be given with reference to a case in which a block is composed of four pixels (two rows and two columns), it is apparent that this block structure is nonlimiting and may be modified, for example, to a nine-pixel structure (three rows and columns) or a structure in which a plurality of pixels are arranged in one horizontal row.

Although the process of converting number of tones of the present embodiment is described with reference to a case in which the procedure is carried out in units of target blocks thus set, it is also possible to adopt an approach in which the position of a target block in the image is confirmed and an appropriately selected routine is performed in order to prevent this procedure from having an adverse effect on image quality. Specifically, it is determined whether the target block is in a high-luminosity (bright) highlighted area of the image, a transitional area (somewhat dimmer than the highlighted area, yet not quite at the level of an intermediate tone value area) of the image, or an area whose luminosity is no less than that of the intermediate tone value, and an appropriate procedure is carried out in accordance with the result. Each of these areas will be described below.

D-1. Processing of Highlighted Areas

Once a target block is set for an image, image data are read for the pixels constituting the target block (step S202 in FIG. 5). What is read in this case is the tone data related to the colors C, M, Y, and K and stored in the RAM 106 following a color conversion.

The sum of the image data thus read is then calculated (step S204). Specifically, the sum S is calculated using the equation $$S = DTa + DTb + DTc + DTd \quad (1),$$

where DTa, DTb, DTc, and DTd are the tone values of the four pixels constituting the target block, that is, pixels Pa, Pb, Pc, and Pd, respectively. In more-general terms, the sum S can be calculated using the equation $$S = \Sigma(DTij),$$

assuming that the target block is composed of pixels arranged in a rectangular matrix having n rows and m columns. In the equation, i is an integer from 1 to n, and j is an integer from 1 to m.

It is then determined whether the sum S thus obtained is equal to zero (step S206). Since the tone values of each of these pixels can range from 0 to 255, the only instance in which the sum S amounts to zero is when all the tone values of the pixels constituting the target block are equal to zero. In other words, it is determined in step S206 whether the target block is composed exclusively of pixels whose tone values are equal to zero. In the event that the target block is composed exclusively of pixels whose tone values are equal to zero ("yes" in step S206), it is concluded that no dots have been formed for any of the pixels constituting the target pixel (step S212).

Correction data Bx are calculated (step S208) for the target block if the pixels constituting the target block contain even one pixel whose tone value is different from zero ("no" in step S206). The correction data Bx of the block can be determined by adding the previously calculated sum S and the diffusion errors diffused from the periphery among the pixels constituting the target block. The correction data Bx of the target block can be determined using the equation $$Bx = S + ETa + ETb + ETc + ETd \quad (2),$$

where EDa, EDb, EDc, and EDd are the diffusion errors diffused among the four pixels constituting the target block, that is, pixels Pa, Pb, Pc, and Pd, respectively. The manner in which the errors are progressively diffused from peripheral pixels will be described below. Because the diffusion errors diffused among the pixels are stored by the RAM 106 for each pixel, these diffusion errors are read and the correction data Bx are calculated in step S208. Alternatively, the diffusion errors of the pixels may be read concurrently when the tone value of each pixel has already been read in step S202.

The resulting correction data Bx are subsequently compared with a specific threshold value th1 (step S210). When the correction data Bx is less than the threshold value th1, that is, not all the tone values of the pixels constituting the target block are equal to zero, it is still concluded that no dots have been formed in the pixels of the target block if the correction data Bx corresponds to a low value (step S212).

If the correction data Bx is greater than the threshold value th1 in step S210, the data are compared with a specific threshold value th2 (step S214). The threshold values th2 and th1 are selected such that th1< th2. In the event that the value of the correction data Bx is less than the threshold value th2, that is, greater than the threshold value th1 but less than the threshold value th2 ("no" in step S214), it is concluded that a dot has been formed in only one of the pixels constituting the target block (step S216).

FIG. 7 depicts the manner in which a dot has been formed in only one of the pixels constituting the target block. Although a dot formed in a single pixel of a target block can occupy four dot-forming positions (as shown in the drawing), it will be assumed with reference to the present embodiment that the dot is always formed in the upper left pixel of the target block (see FIG. 7*a*). This assumption simplifies processing and makes it possible to rapidly determine the dot on-off state. It is apparent, however, that any of the four states shown in FIGS. 7a–7d can be selected. It is also possible to assume that the dot is formed in the pixel with the highest tone value from among the pixels constituting a target block.

Figure 8A:
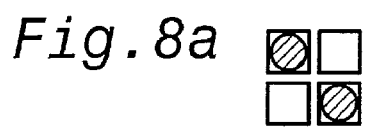
FIG. 8 is a diagram depicting an example in which a dot is formed in only two of the pixels constituting a target block.
Figure 8B:
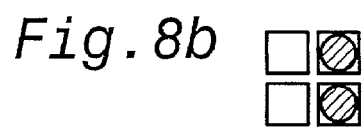

It was assumed with reference to the tone number conversion module of the present embodiment that a dot is formed in only one block pixel when the value of the correction data Bx is less than the threshold value th2, and that the dot on-off state is determined while errors are diffused inside the block when the value of the data is greater than the threshold value th2. It is also reasonable to assume that dots are formed in two pixels within a block if a threshold value th greater than the threshold value th2 is set and if the value of the correction data Bx is greater than the threshold value th2 but less than the threshold value th. Various combinations are possible for the positions of dot-forming pixels, as illustrated by the example depicted in FIG. 8. The dots may be formed at fixed positions, randomly varied, or formed in order from the pixels with greater tone values.

If the correction data Bx of a target block are less than the threshold value th2, it is assumed that a high-luminosity (bright) portion (that is, a highlighted area) of a pixel has been processed, and the dots are merely formed in a random arrangement. The image quality of such a portion remains high even when the dot on-off state is determined based on the correction data Bx of the entire block, as described above. In addition, forming dots in such a random manner eliminates the risk that image quality will be adversely affected when, for example, the dot-forming position would be dislocated by a single pixel. Consequently, simplifying processing in this manner allows the dot on-off state to be rapidly determined while preserving the desired image quality.

D-2. Processing of Transitional Highlighted Areas

If the value of the correction data Bx for a target block is greater than the threshold value th2 in step S214, it is assumed that the area in question is not a regular highlighted area but a transitional highlighted area whose luminosity (brightness) is not as low as that of an intermediate tone value area. For such areas, the dot on-off state is determined for each pixel while tone errors are diffused among the other pixels in the target block in order to preserve the desired image quality. Procedures different from those used for transitional highlighted areas are employed to process image areas that lie beyond the intermediate tone value in order to further improve image quality in the process of converting number of tones of the present embodiment. In view of this, the value of the correction data Bx is compared in terms of magnitude with a threshold value th3 (step S218) if the value of the correction data is greater than the threshold value th2 in step S214. The threshold value th3 referred to herein is set to a level at which the relation th2 <th3 is satisfied. In the event that the value of the correction data Bx of a target block is confirmed to be less than the threshold value th3, the conclusion is that the target block is in a transitional highlighted area, so the dot on-off state is determined for each pixel while errors are diffused within the target block in the manner described below (step S220).

Figure 9A:
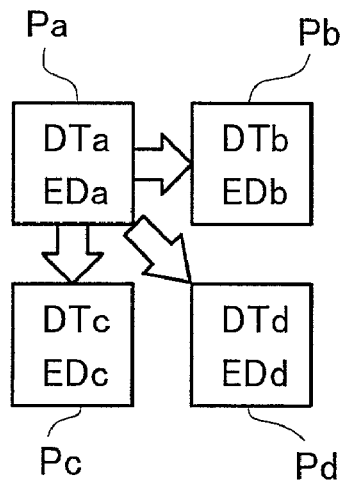
FIG. 9 is a diagram schematically showing a method whereby the dot on-off state is determined for each pixel while errors are diffused among the pixels of a target block.
Figure 9B:
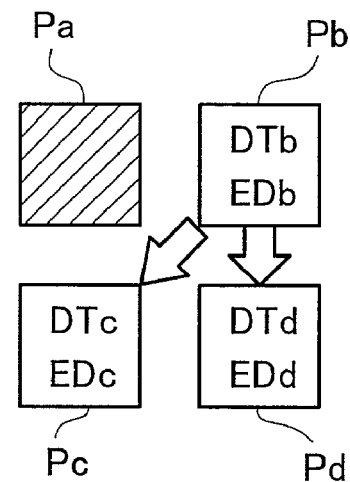
Figure 9C:
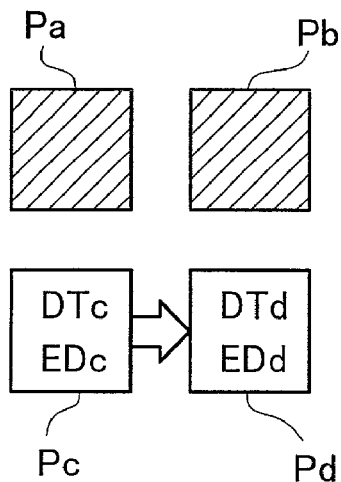
Figure 9D:
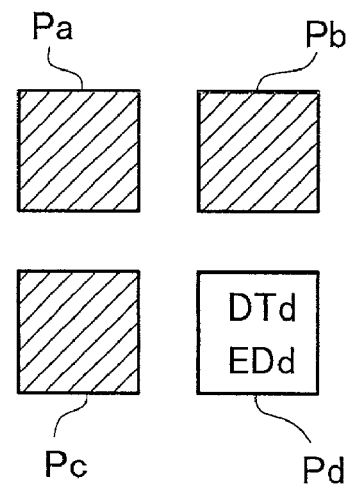
Figure 10:
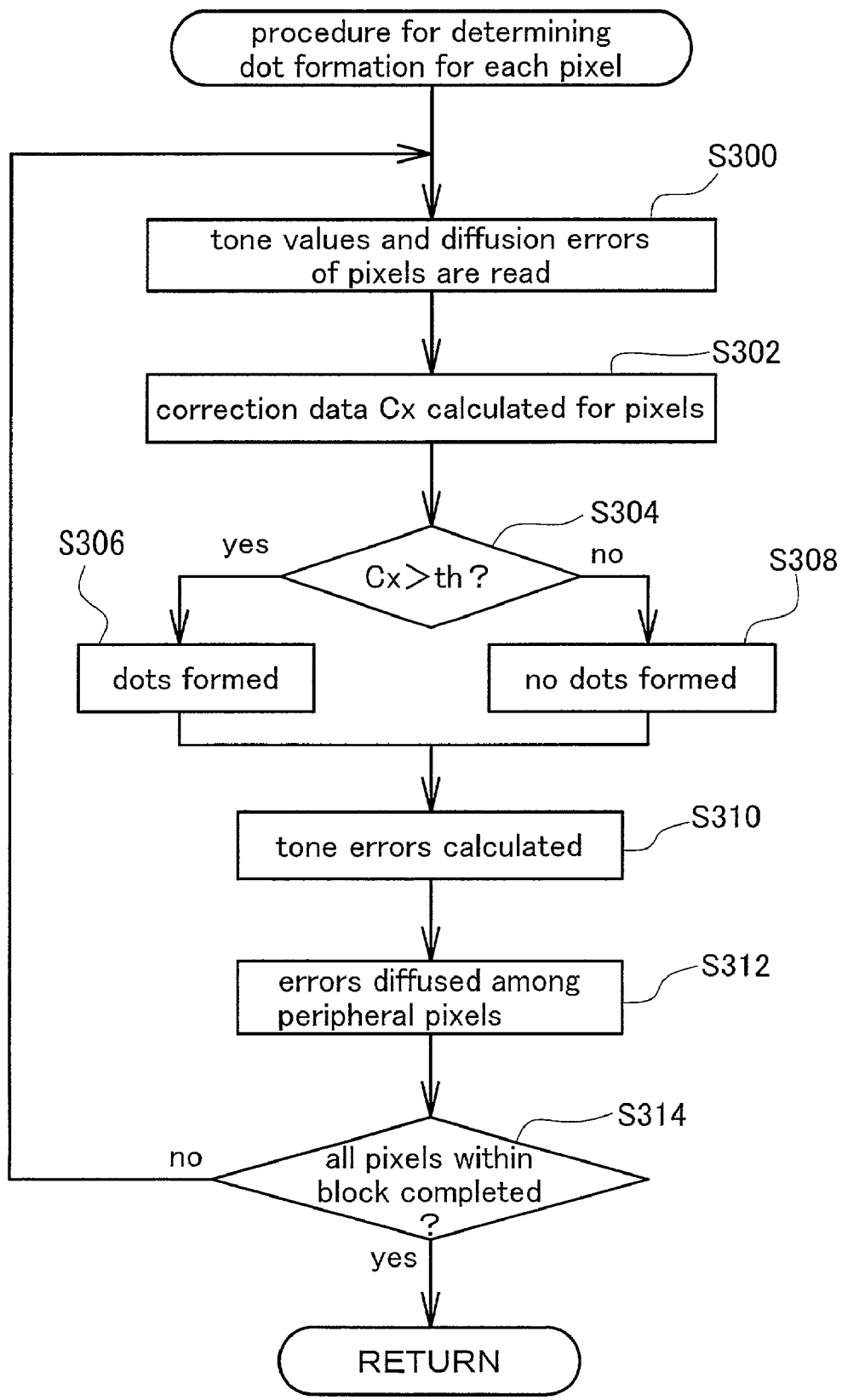
FIG. 10 is a flow chart depicting the progress of a procedure for determining the dot on-off state for each pixel.
Figure 11A:
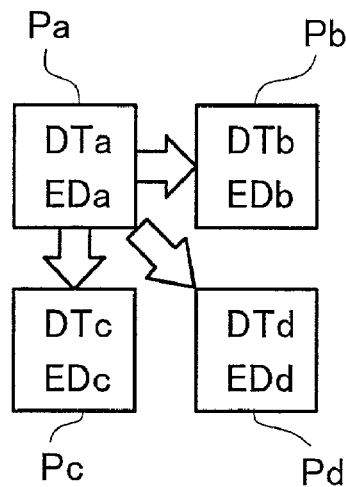
FIG. 11 is a diagram schematically showing another method whereby the dot on-off state is determined for each pixel while errors are diffused among the pixels of a target block.
Figure 11B:
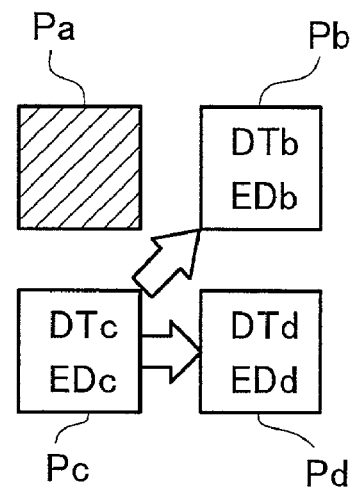
Figure 11C:
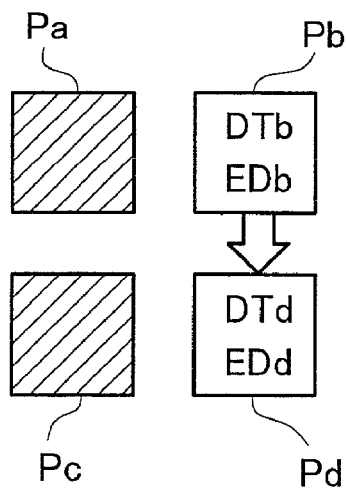
Figure 11D:
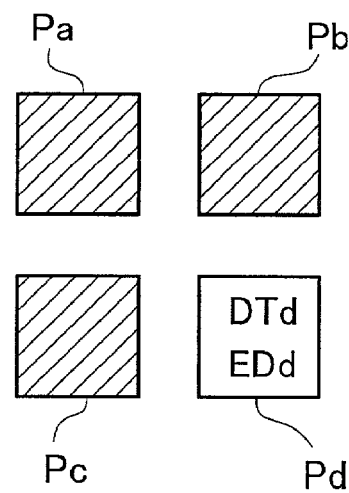

FIG. 9 is a diagram schematically depicting the method used to determine the dot on-off state for each of the pixels in a target block. The four squares shown in FIG. 9a depict the four pixels constituting a target block. FIG. 10 is a flow chart depicting the process flow. The procedure involved in determining the dot on-off state for each pixel will now be described with reference to FIGS. 9 and 10.

When the procedure for determining the dot on-off state is started, tone values and diffusion errors are first read (step S300 in FIG. 10) for the pixels to be processed. The tone values of a pixel constitute the image data for each of the colors stored in the RAM 106 after undergoing a color conversion. The diffusion errors are the errors diffused from peripheral pixels and stored in the RAM 106. The manner in which such diffusion errors are diffused from peripheral pixels will be described below. The presence of symbols DTa and EDa in the square depicting pixel Pa in FIG. 9a schematically indicates that a tone value DTa and a diffusion error EDa are assigned to the pixel Pa and stored in the RAM 106. In the case under consideration, the procedure is assumed to start from the upper left pixel Pa of a target block, and the tone value DTa and diffusion error EDa of the pixel Pa are read.

The correction data Cx of the pixel Pa is subsequently calculated (step S302) by adding the tone value and diffusion error thus read, and the type of relation between the value of the correction data Cx thus calculated and the magnitude of a specific threshold value th is determined (step S304). It is determined that a dot is formed in the pixel Pa (step S306) if the correction data Cx correspond to a greater value, and that there are no dots in the pixel Pa if the above condition is not satisfied (step S308). Variables expressing pixel-related determination results accumulate as a result of the conversion procedure.

Once the dot on-off state in the pixel Pa is determined in this manner, calculations are performed (step S310) to determine the tone errors generated during the conversion procedure. These tone errors can be calculated as the tone values of particular pixels less the tone values expressed for these pixels by the dot on-off state (these tone values will be referred to hereinbelow as "resulting values").

The tone errors thus obtained are diffused among the undetermined peripheral pixels of the same block (step S312). As is evident from FIG. 9a, the three pixels Pb, Pc, and Pd remain in the same block as unconverted pixels when the dot on-off state is determined for the pixel Pa. In view of this, the tone error generated by the pixel Pa in step S312 is distributed in three equal parts between the three pixels and is added to the diffusion errors stored for each pixel. For example, the diffusion error EDb is already stored in the RAM 106 for the pixel Pb, so the error distributed from the pixel Pa (one third of the tone error generated by the pixel Pa) is added to this value and stored in the RAM 106 as a new diffusion error EDb. The same procedure is carried out for the pixels Pc and Pd. Such a procedure is performed in step S312 (FIG. 10). The tone error is not necessarily distributed in equal parts among the undetermined peripheral pixel and can be distributed among the pixels in a specific ratio. The arrows pointing away from the pixel Pa toward the other three pixels in FIG. 9a schematically illustrate the manner in which the error generated by the pixel Pa is diffused among the other three pixels.

Once the dot on-off state has been determined for the pixel Pa in this manner, it is determined whether conversion procedures have been completed for all the pixels of the target block (step S314 in FIG. 10), and if the procedures involving all the pixels have not been completed, a procedure is continued in which the dot on-off state is determined for a new pixel.

The conversion procedure is started for the pixel Pb once the dot on-off state has been determined for the pixel Pa. The conversion procedure for the pixel Pb can be performed in substantially the same manner as the conversion procedure for the pixel Pa. FIG. 9b is a diagram schematically illustrating the manner in which the dot on-off state is determined for the pixel Pb. The hatching on the pixel Pa indicates that the dot on-off state has already been determined for this pixel. When the procedure aimed at determining the dot on-off state is started for the pixel Pb, the tone values of the pixel Pb are first read together with the diffusion error EDb diffused and stored for the pixel Pb, and correction data Cxb are calculated for the pixel Pb. The diffusion error EDb of the pixel Pb thus read is a new diffusion error EDb obtained by adding the error diffused from the pixel Pa to the originally stored diffusion error assigned to the pixel Pb. The correction data Cxb for the pixel Pb can be determined by adding together the tone value DTb and the diffusion error EDb. The dot on-off state is determined for the pixel Pb by comparing a specific threshold value th and the correction data Cxb thus obtained, and the tone error resulting from the conversion procedure is calculated.

The tone error obtained in this manner for the pixel Pb is diffused among the unconverted pixels of the target block. As shown in FIG. 9b, the tone error produced by the pixel Pb is divided in half between the two pixels Pc and Pd because the procedure aimed at determining the dot on-off state is already completed for the pixel Pa. It is apparent that the errors may also be diffused in a specific ratio.

The conversion procedure is started for the pixel Pc once the dot on-off state has been determined for the pixel Pb. FIG. 9c is a diagram schematically illustrating the manner in which the dot on-off state is determined for the pixel Pc. At the start of the procedure aimed at determining the dot on-off state for the pixel Pc, originally stored diffusion errors are added to the stored diffusion error EDc assigned to the pixel Pc, and the error from the pixel Pa and the error from the pixel Pb are added together. When the dot on-off state is determined for the pixel Pc, correction data are calculated by adding together a tone value DTc and the diffusion error EDc obtained by adding the above errors, and the dot on-off state is determined by comparing the result with the specific threshold value th. When the dot on-off state is determined for the pixel Pc, the only unconverted pixel remaining in the target block is pixel Pd, as shown in FIG. 9c. At this point, the entire tone error generated by the pixel Pc is diffused to the pixel Pd, added to the diffusion error originally stored for the pixel Pd, and stored as a new diffusion error EDd. The resulting diffusion error EDd of the pixel Pd and the resulting tone error DTd of the pixel Pd are added together to calculate correction data Cxd, and the result is compared with the threshold value th to determin the dot on-off state for the pixel Pd. In step S220 (FIG. 5), the dot on-off state is determined in this manner for each pixel while errors are diffused within the target block.

Although the example shown in FIG. 9 was described with reference to a case in which the conversion procedure was carried out sequentially for the pixels Pa, Pb, Pc, and Pd when the dot on-off state was determined for the pixels constituting a target block, performing the conversion procedure in this order is not always necessary and may be replaced with a procedure in which the dot on-off state is carried out sequentially for the pixels Pa, Pc, Pb, and Pd, as shown, for example, in FIG. 11. A comparison of these drawings indicates that the errors are diffused within blocks in different directions in FIGS. 9 and 11, and a sequence capable of yielding acceptable image quality can be selected as needed.

As described above, the error generated by a target block is calculated (step S222) once the dot on-off state is conformed for each of the pixels within the target block. The error generated by the target block is also calculated as a result of such a determination when it is determined that no dots are formed in any of the pixels of the target block (step S212) or that a dot is formed in a single pixel (step S216) in the manner described above.

The errors generated by the target block can be calculated by subtracting the resulting value for this target block from the value of the correction data Bx for this block. As referred to herein, the correction data Bx of a target block are obtained by adding together the sum S of the tone values for the pixels constituting the target block and the diffusion error stored for each pixel. The sum S can be calculated using Eq. (1); the correction data Bx of the target block, Eq. (2). In addition, the resulting value of a target block is the sum of the resulting values (tone values assigned to the pixels depending on the dot on-off state) for the pixels constituting the block.

When, for example, no dots are formed in any of the pixels in a target block (as in step S212), the resulting value of each pixel is equal to zero, so the resulting value of the block is also zero. Consequently, the value of the correction data Bx is directly provided as an error for the target block. Similarly, the resulting value of a target block serves as the resulting value of a dot-forming pixel when the dot is formed in only one pixel within the target block (as in step S216). A value obtained by subtracting the resulting value of the dot-forming pixel from the correction data Bx will therefore be generated as an error for this target block. The error generated by a target block can be determined in the same manner when the dot on-off state is determined for each of the pixels in a target block (as in step S220). Indeed, the errors of a target block and the tone error of a pixel (pixel Pd in the example shown in FIG. 9) for which the dot on-off state is determined ultimately agree with each other because the dot on-off state is determined while the tone error generated by each pixel is diffused among the unconverted pixels of the target block by the procedure of step S220, as described with reference to FIG. 9. The errors generated by a target block can therefore be determined in a simple manner by calculating the tone error for the pixel Pd.

Figure 12:
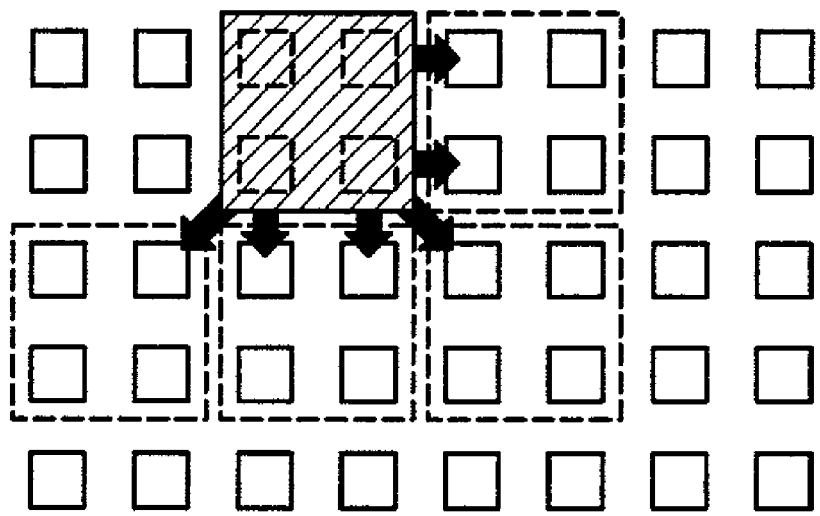
FIG. 12 is a diagram schematically showing the manner in which a tone error generated by a target block is diffused among peripheral pixels.

After the errors generated by a target block have been calculated, the errors are diffused among peripheral pixels (step S224). FIG. 12 is a diagram schematically depicting the manner in which errors generated by a target block are diffused among peripheral pixels. The small squares shown in FIG. 12 are a schematic representation of pixels. The large hatched squares are target blocks. As shown by the dashed lines drawn in the target blocks, a target block comprises four pixels. An error generated by an entire target block composed of these pixels, rather than the errors generated by individual pixels, are diffused among the peripheral pixels. In FIG. 12, black arrows depict the manner in which the error of a target block is diffused among six peripheral pixels. The reason that no error is diffused among the pixels on the left side of the target block is that the procedure for determining the dot on-off state has been completed for these pixels.

Figure 13:
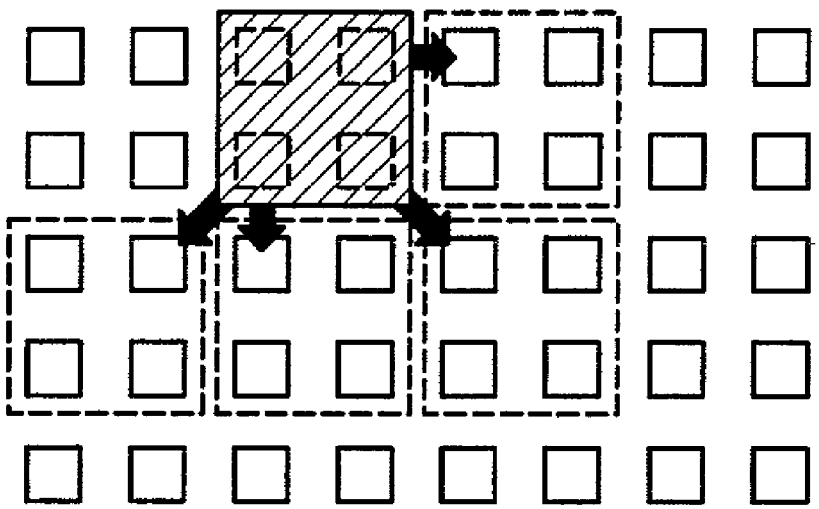
FIG. 13 is a diagram schematically showing a modified example in which a tone error generated by a target block is diffused among peripheral pixels.

When the dot on-off state is determined solely on the basis of correction data Bx related to the target block (step S212 or S216 in FIG. 5) or when the dot on-off state is determined for each pixel while errors are diffused within the target block (step S220 in FIG. 5) in the above-described manner, the dot on-off state is determined in block units in both cases, so diffusing such errors between "particular" pixels within a block is not much of a problem. This suggests that the errors generated by a target block may be diffused in the manner shown in FIG. 13. In the specific case of a target block disposed in a highlighted area (as in step S212 or S216 in FIG. 5), the errors diffused between the two pixels on the right side from the target block in FIG. 12 will end up being diffused among the same blocks irrespective of which pixel is selected for such diffusion (as shown in FIG. 13), so identical results are obtained by determining the dot on-off state. If the target block is disposed in a transitional highlighted area (as in step S220 in FIG. 5), the dot on-off state is determined for each pixel, so different dot-forming pixels are obtained when the errors designed for diffusion between two pixels are diffused to either of two. Even in this case, however, the dot on-off state is determined while the errors are diffused among the block pixels, so the same result is obtained if the entire block is considered, and the positions of the dot-forming pixels within the block differ only slightly. Another factor is the diffusion of errors to the two pixels underneath the target block in FIG. 12, in which case substantially the same results are obtained by diffusing the errors to either pixel. It can thus be concluded that the errors can be diffused as shown in FIG. 13 instead of FIG. 12. The ratio in which the errors are diffused among pixels can be preset to an appropriate level.

FIG. 14 depicts examples of setting the ratio at which errors are diffused among pixels. In FIG. 14, the large hatched squares represent target blocks, and the small squares on the periphery represent the pixels among which errors are distributed from the target blocks. The large squares within the dashed lines represent blocks that are peripheral in relation to the target blocks.

Figure 14A:
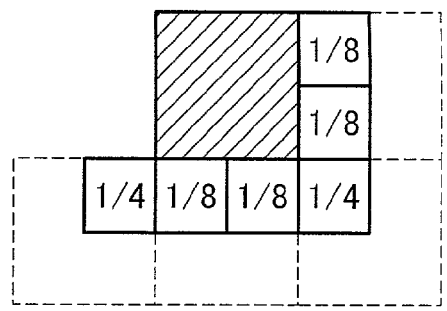
FIG. 14 is a diagram showing the procedure for setting the ratio according to which a tone error generated by a target block is diffused among peripheral pixels.
Figure 14B:
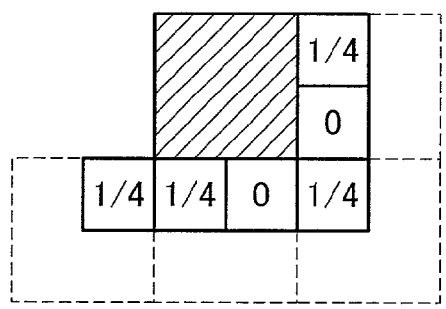

In the example shown in FIG. 14a, the two pixels on the right from the target block are each assigned ⅛th of the error generated by the target block. Similarly, the two pixels underneath the target block are each assigned ⅛th of the error. The pixels on the bottom left or bottom right of the target block are each assigned ¼th of the error. Such error diffusion will ensure that each of the blocks around the target block will be assigned ¼th of the error in a uniform manner. For example, assigning the error in the manner shown in FIG. 14b will produce substantially the same result as that obtained in FIG. 14a. Thus, diffusing errors to the same block in a collective manner makes it possible to reduce the number of pixels involved in error diffusion and to achieve an increase in the speed with which the procedure is carried out.

Figure 14C:
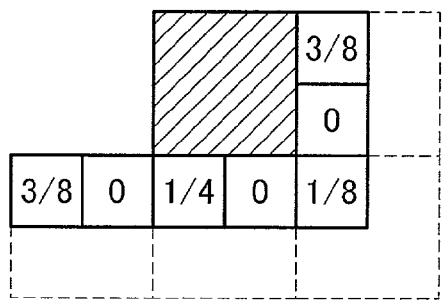

In the example shown in FIG. 14c, errors are assigned to different blocks in different ratios. It is also possible to vary the error diffusion rate among blocks such that high image quality is obtained. For the block disposed on the bottom left of the target block, the errors are diffused among those pixels of the block that are the first to be selected for the procedure in which the dot on-off state of the block is determined. It is thus possible to diffuse the errors among pixels disposed at a distance from the target block.

Figure 14D:
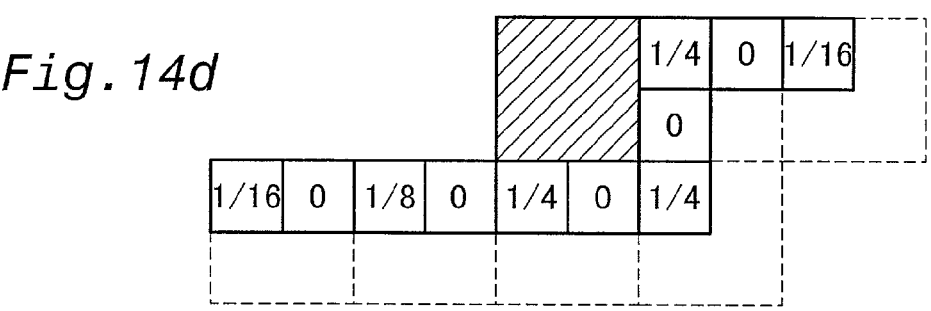
Figure 14E:
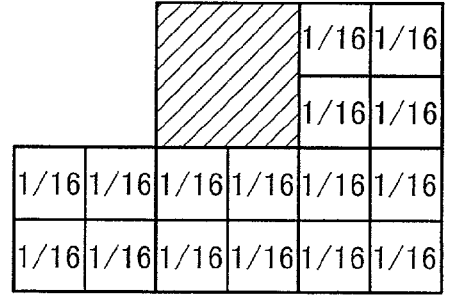

It is apparent that the errors can also be diffused over a wide range of blocks, including those disposed at a distance from the target block, as shown in FIG. 14d. It is also possible to diffuse errors in block units, as shown in FIG. 14e. Specifically, it is possible to adopt an approach in which errors are diffused from a target block to peripheral blocks, and the error diffused to each block is uniformly distributed among the block pixels.

In step S224 (FIG. 5), a procedure is performed in which the errors generated by an entire target block are diffused among peripheral pixels in a specific ratio, as described above.

D-3. Processing of Areas Beyond Intermediate Tone Value

In step S218, a target block is deemed to be located in an image area beyond an intermediate tone value if the value of the correction data Bx for this target block is greater than a threshold value th3. Determining the dot on-off state in block units in such an area will allow the dot on-off state to be determined (step S226) while the errors generated by the pixels are diffused in the same manner as when the so-called error diffusion technique is employed. For this reason, the process of converting number of tones in the present embodiment allows image quality to be preserved even in an image area that lies beyond the intermediate tone values.

FIG. 15 schematically depicts a procedure in which the dot on-off state is determined for each pixel while pixel errors are diffused in step S226. In FIG. 15, the large squares with the dashed lines represent target blocks, and the squares enclosed by solid lines inside the target blocks represent pixels. Pixels outside the target blocks are shown as dashed line squares. The pixels within the target blocks are distinguished by the use of Pa, Pb, Pc, and Pd for the upper left, upper right, lower left, and lower right pixels, respectively. The Dta, DTb, DTc, and DTd on the pixels Pa, Pd, Pc, and Pd designate the tone values of the corresponding pixels, whereas EDa, EDb, EDc, and EDd designate the diffusion errors stored after being diffused among the pixels.

The procedure in which the dot on-off state is determined for each pixel while the pixel errors are diffused in step S226 is substantially the same as the one previously described with reference to FIGS. 9 and 10 (procedure of step S220). A significant difference between the two is that whereas the procedure described above with reference to step S220 is such that the error generated by each pixel is diffused among the pixels of the target block, the procedure described below with reference to step S226 is such that the errors are also diffused among pixels outside the target block. A procedure substantially equivalent to the one performed by the method referred to as the error diffusion technique can thus be accomplished because the dot on-off state is determined while the errors generated by the pixels are diffused among the pixels outside the target block. As a result, the dot on-off state can be determined without affecting the image quality of an area that lies beyond an intermediate tone value. The procedure performed in step S226 of FIG. 5 will now be described with reference to FIG. 15 by making use of the flow chart shown in FIG. 10.

Similar to the procedure performed in step S220, the first step of the procedure in step S226 entails reading the diffusion error EDa and the tone value DTa of the pixel Pa in the upper left corner of the target block at the start of the procedure (corresponds to step S300 in FIG. 10). The tone value and diffusion error of each pixel is assigned to the corresponding pixel and stored in the RAM 106.

The correction data Cx of the pixel Pa is subsequently calculated (corresponds to step S302 in FIG. 10) by adding the tone value and diffusion error thus read, and the type of relation between the value of the correction data Cx thus calculated and the magnitude of a specific threshold value th is determined (corresponds to step S304 in FIG. 10). It is determined that a dot is formed in the pixel Pa (corresponds to step S306 in FIG. 10) if the correction data Cx correspond to a greater value, and that there are no dots in the pixel Pa if the above condition is not satisfied (corresponds to step S308 in FIG. 10). Variables expressing pixel-related determination results accumulate as a result of the conversion procedure.

Figures 16A, 16B, 16C, 16D:
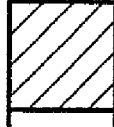
FIG. 16 is a diagram showing the ratio for diffusing errors among peripheral pixels when the dot on-off state is determined in block units while the tone error generated by each pixel is diffused among peripheral pixels.
Figure 17A:
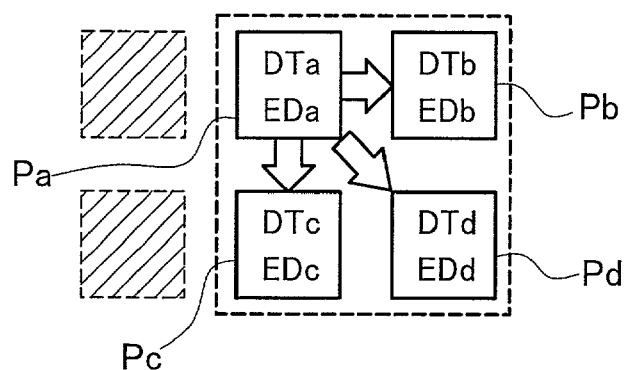
FIG. 17 is a diagram schematically showing another embodiment in which the dot on-off state is determined in block units while the tone error generated by each pixel is diffused among peripheral pixels.
Figure 17B:
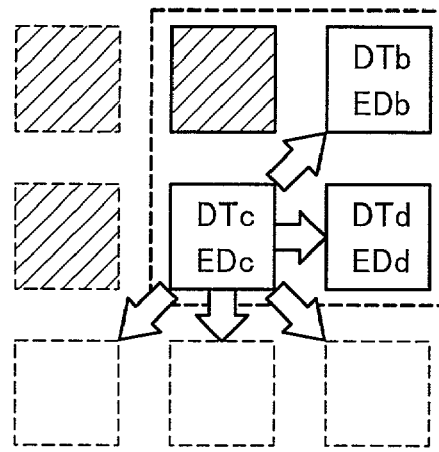
Figure 17C:
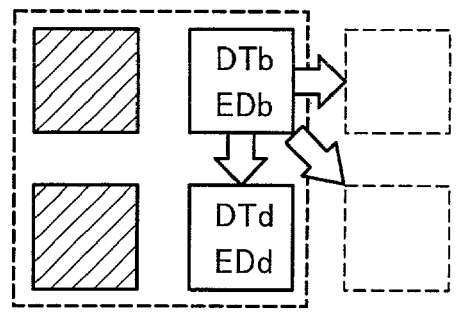
Figure 17D:
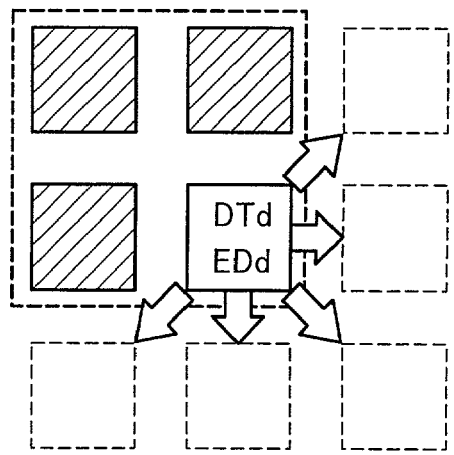

Once the dot on-off state in the pixel Pa is determined in this manner, calculations are performed (corresponds to step S310 in FIG. 10) to determine the tone errors generated during the conversion procedure. The tone errors thus obtained are diffused among undetermined peripheral pixels in a specific ratio (corresponds to step S312 in FIG. 10). In this case, the procedure of step S226 in FIG. 5 is performed such that the ratio in which the errors are diffused among the peripheral pixels is preset in accordance with the positions occupied in the target block by the pixels generating the tone errors. FIG. 16 is a diagram depicting an example of the ratio in which tone errors are diffused among peripheral pixels in accordance with the positions occupied by the error-generating pixels. FIG. 16a shows the ratio in which the tone error generated by the pixel in the upper left corner of a target block (pixel Pa) is diffused among peripheral pixels. The asterisked positions in the drawing are those of the pixels that generate tone errors. A portion equal to ⅜th of the tone error generated by the pixel Pa is diffused to each of the pixels Pb and Pc, and ¼th of the tone error is diffused to the pixel Pd. It is apparent that the diffusion ratio is not limited to this arrangement and can be set in a variety of ways depending on the characteristics of the pixels being processed.

Figure 15A:
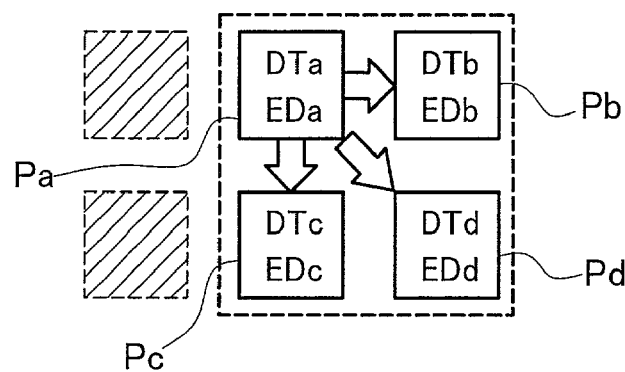
FIG. 15 is a diagram schematically showing the manner in which the dot on-off state is determined in block units while the tone error generated by each pixel is diffused among peripheral pixels.

FIG. 15a is a diagram schematically depicting the manner in which the tone error generated by a pixel Pa is diffused among undetermined peripheral pixels. The hatched pixels are those for which the dot on-off state has already been determined. As can be seen in the drawing, the dot on-off state is already determined for the pixel to the left of pixel Pa. Another feature of the process of converting number of tones performed in accordance with the present embodiment is that the dot on-off state is already determined for the pixel above the pixel Pa because the dot on-off state is determined in sequence from the overlying block in the same manner as with the common process of converting number of tones. It thus follows that the other three pixels of the target block (namely, pixels Pb, Pc, and Pd) constitute the unconverted pixels around the pixel Pa and that the tone error generated by the pixel Pa is diffused among these three pixels.

If it is assumed, for example, that the ratio in which errors are diffused among pixels is the one shown in FIG. 16a, then the pixel Pb will receive ⅜th of the tone error generated by the pixel Pa, the error thus received will be added to a diffusion error EDb stored after being assigned to the pixel Pb, and the result will be stored as a new diffusion error EDb for the pixel Pb. The same procedure is adopted for the pixel Pc: ⅜th of the tone error generated by the pixel Pa is added to the value of a diffusion error EDc, and the result is stored as a new diffusion error EDc for the pixel Pc. With the pixel Pd, ¼th of the tone error generated by the pixel Pa is added, and the result is stored as a new diffusion error EDd for the pixel Pd. In FIG. 15a, the outline arrows pointing away from the pixel Pa to the other three pixels schematically show the manner in which a tone error generated by the pixel Pa is distributed among the other three pixels.

Once the dot on-off state has been determined for the pixel Pa in this manner and the tone error generated by the pixel Pa has been diffused among the undetermined peripheral pixels, it is determined whether conversion procedures have been completed for all the pixels of the target block (corresponds to step S314 in FIG. 10), and if the procedures involving all the pixels have not been completed, a procedure is continued in which the dot on-off state is determined for a new pixel.

Figure 15B:
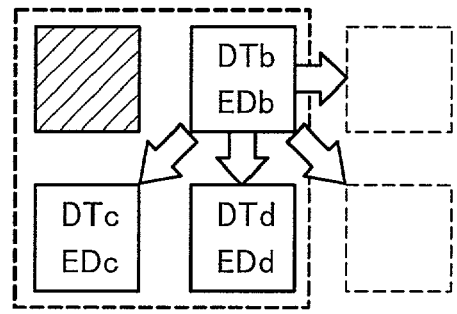

The conversion procedure is started for the pixel Pb once the dot on-off state has been determined for the pixel Pa. The conversion procedure for the pixel Pb can be performed in substantially the same manner as the conversion procedure for the pixel Pa. FIG. 15b is a diagram schematically illustrating the manner in which a tone error generated by the pixel Pb is diffused among undetermined peripheral pixels. Since the dot on-off state is already determined for the pixel Pa, the tone error generated by the pixel Pb is diffused among a total of four pixels, of which two are inside the target block and the other two outside the target block, as shown in the drawing. FIG. 16b shows an example of the ratio in which a tone error from the pixel Pb is diffused among undetermined peripheral pixels.

Figure 15C:
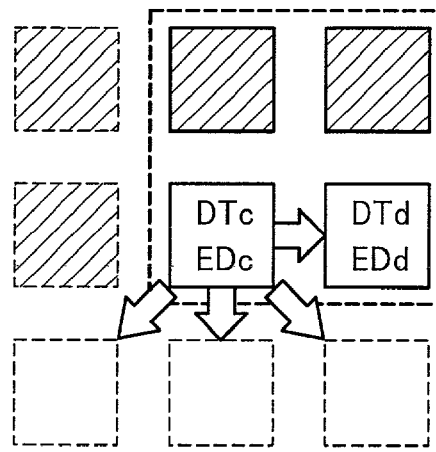

The conversion procedure is performed for the pixel Pc in the same manner once the dot on-off state has been determined for the pixel Pb. FIG. 15c is a diagram schematically illustrating the manner in which a tone error generated by the pixel Pc is diffused. As shown in the drawing, the dot on-off state has already been determined for the pixels Pa and Pb in the target block, so the tone error generated by the pixel Pc is diffused in a specific ratio among a total of four pixels, which consist of the pixel Pd of the target block and three pixels outside the target block. FIG. 16c is a diagram showing the ratio in which the tone error generated by the pixel Pc is diffused among the peripheral pixels. The conversion procedure is performed for the pixel Pd once the error generated by the pixel Pc has been diffused in this manner among the undetermined peripheral pixels in a specific ratio.

Figure 15D:
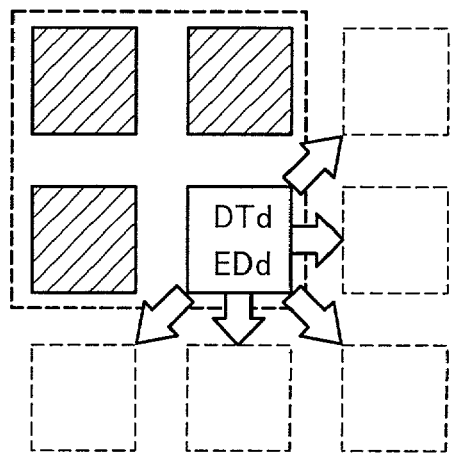

FIG. 15d is a diagram schematically illustrating the manner in which a tone error generated by the pixel Pd is diffused. As shown in the drawing, there are five unconverted pixels around the pixel Pd, so the tone error is diffused among these pixels. FIG. 16d is a diagram showing the ratio in which the error is diffused among the pixels.

After conversion procedures are completed for the four pixels Pa, Pb, Pc, and Pd in this manner, it is determined whether the procedures have been completed for all the pixels of the target block (corresponds to step S314 in FIG. 10), and the procedure of step S226 in FIG. 5 is thus completed.

As described above, the procedure of step S226 in FIG. 5 is performed equivalently to a so-called error diffusion technique. In the above procedure, the dot on-off state is determined while the tone error generated by each pixel is diffused among undetermined peripheral pixels as the dot on-off state is determined in block units. For this reason, the dot on-off state can be determined and the desired image quality preserved when the target block is located in an image area that lies beyond an intermediate tone value.

Although the conversion procedure was carried out sequentially for the pixels Pa, Pb, Pc, and Pd when the dot on-off state was determined for the pixels constituting a target block in the example shown in FIG. 15, performing the conversion procedure in this order is not always necessary and may be replaced with a procedure in which the dot on-off state is carried out sequentially for the pixels Pa, Pc, Pb, and Pd, as shown, for example, in FIG. 17. A comparison of these drawings indicates that the errors are diffused within blocks in different directions in FIGS. 15 and 17, and a sequence capable of yielding acceptable image quality can be selected as needed. It is also possible to diffuse tone errors across a wider range of pixels, as shown in FIG. 14.

Once the procedures of step S226 or S224 in FIG. 5 are completed, the dot on-off state is determined for the target block designated in step S200, and the tone error generated by this conversion procedure is completely diffused. This step is therefore followed by a routine for determining whether such procedures have been completed for all blocks (step S228). If unprocessed blocks still remain, the operation returns to step S200, the target block is moved one block, and a series of procedures are then performed. Once the dot on-off state has been determined for all blocks in this manner, the process of converting number of tones is completed and the operation returns to the image data conversion procedure of FIG. 4.

The above-described process of converting number of tones of the present embodiment can be rapidly performed because the dot on-off state can be determined in block units obtained by combining specific numbers of pixels. Another feature is that when the dot on-off state is determined for a target block, the image area to which the target block is assigned is determined based on a relation involving the value of correction data or the value of the tone values for the pixels of the target block, and the dot on-off state is determined by an appropriate method. It is therefore possible to determine the dot on-off state by a method selected in accordance with the tone values or correction data, and hence to preserve the desired image quality despite the fact that the dot on-off state is determined in block units. Another feature is that when the image area in which the dot on-off state is determined is beyond an intermediate tone value, the desired image quality can be preserved because the dot on-off state is determined by a method equivalent to a so-called error diffusion technique.

E. Modifications

The above-described process of converting number of tones has a variety of modifications. A brief description follows.

E-1. First Modification

The above-described process of converting number of tones is such that when the sum S of a target block is equal to zero, that is, the tone value of each of the pixels constituting the target block is equal to zero ("yes" in step S206 of FIG. 5), it is concluded that no dots are formed in the block, and the errors generated by the target block are diffused among peripheral pixels (step S212 or 224 in FIG. 5).

Figure 18:
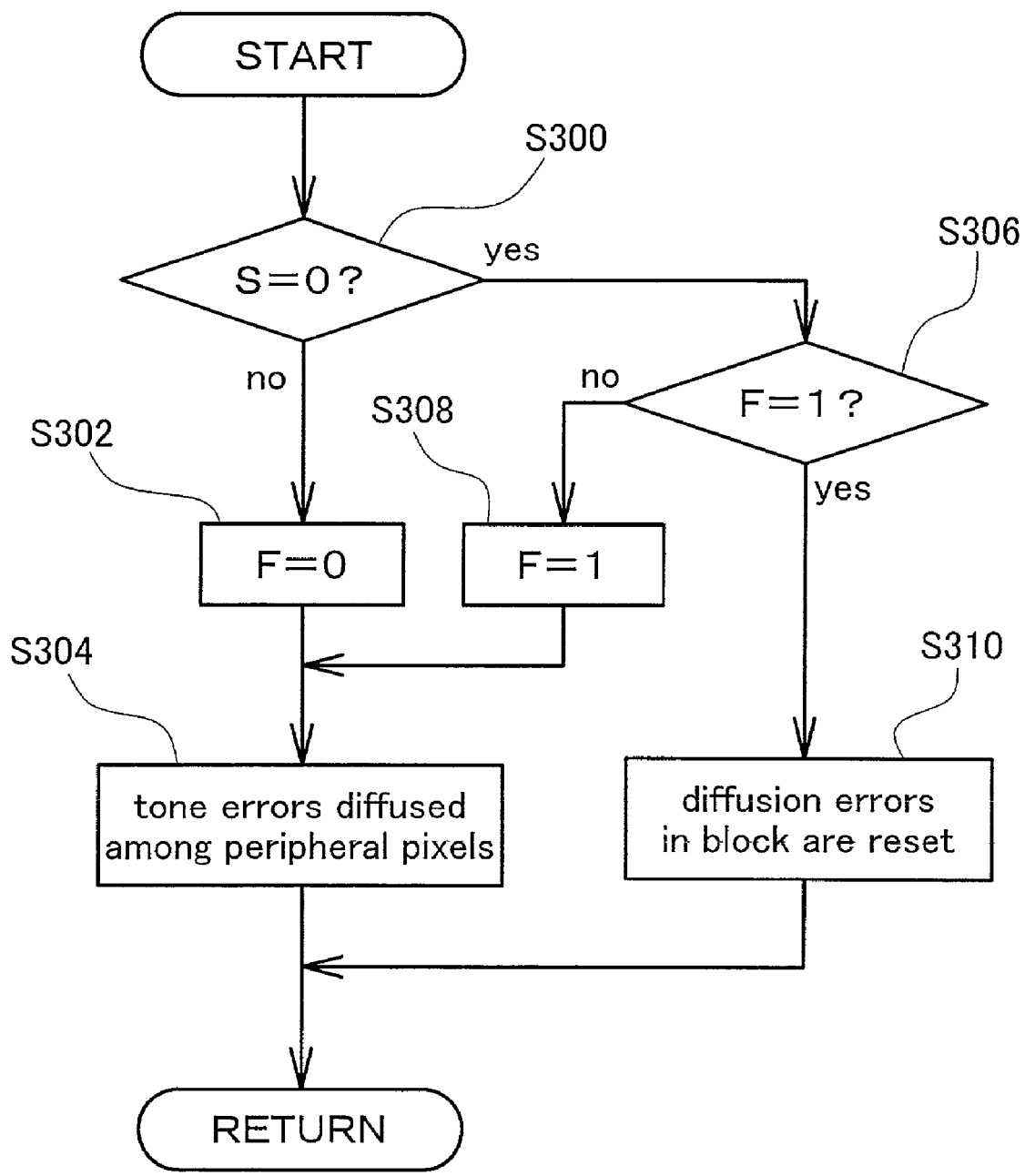
FIG. 18 is a flow chart depicting the flow of processing in a first modification of the process of converting number of tones pertaining to the present embodiment.

An alternative, adopted when the sum S of a target block is continually equal to zero, is to assign zero as the diffusion error stored for each of the pixels in the block. In other words, a procedure such as the one shown in FIG. 18 may be performed in step S224 of FIG. 5. It is first determined whether the sum S of the tone values for the pixels constituting the target block is equal to zero (step S300), a value of 0 is assigned to a flag F (step S302) if the sum S is not equal to zero, and the tone errors generated by the target block are diffused among peripheral pixels (step S304). The specific procedure carried out in step S304 is the same as the procedure carried out in step S224 above.

It is determined in step S300 whether the flag F indicates "1" when the sum S of a target block is zero (step S306). The flag F is set to zero in step S302 if the previously confirmed sum S of the target block is no zero. In this case ("no" in step S306), the flag F is set to "1" (step S308), which is the value indicating that the sum S of a target block is zero, and the tone errors generated by the target block are diffused among peripheral pixels (step S304). The flag F is set to "1" in step S308 if the previously confirmed sum S of the target block is zero. In such a case ("yes" in step S306), the procedure in which the tone errors generated by the target block are diffused is replaced by a procedure in which the expression errors stored for the pixels of the target block are initialized to zero (step S310).

Because the tone values of all the pixels constituting a target block must be equal to zero in order to bring the sum S of the target block to zero level, the fact that the sum S is continually equal to zero indicates that no images is to be created in this area, that is, this area of printing paper is to remain uncolored. According to the above-described first modification, the diffusion error of each pixel is initialized in such areas. It is therefore possible to prevent situations in which errors distributed from the periphery have the effect of forming dots in the areas initially designed to remain free of images, and higher-quality images can thus be formed. A certain increase in processing speed can also be obtained because there is no need to distribute tone errors generated by the blocks whose sums S are continually equal to zero.

E-2. Second Modification

Although the above process of converting number of tones was described with reference to a case in which an appropriate method for determining dot formation was selected based on the sum S or the correction data of a target block, there is no need to always base the selection on the sum or the correction data as long as an appropriate method can be selected based on the tone values of the pixels constituting the target block. It is possible, for example, to select an optimum confirmation method by determining whether the position of the target block corresponds to an image edge, that is, lies in an area of an abrupt change in the tone values of image data.

Figure 19:
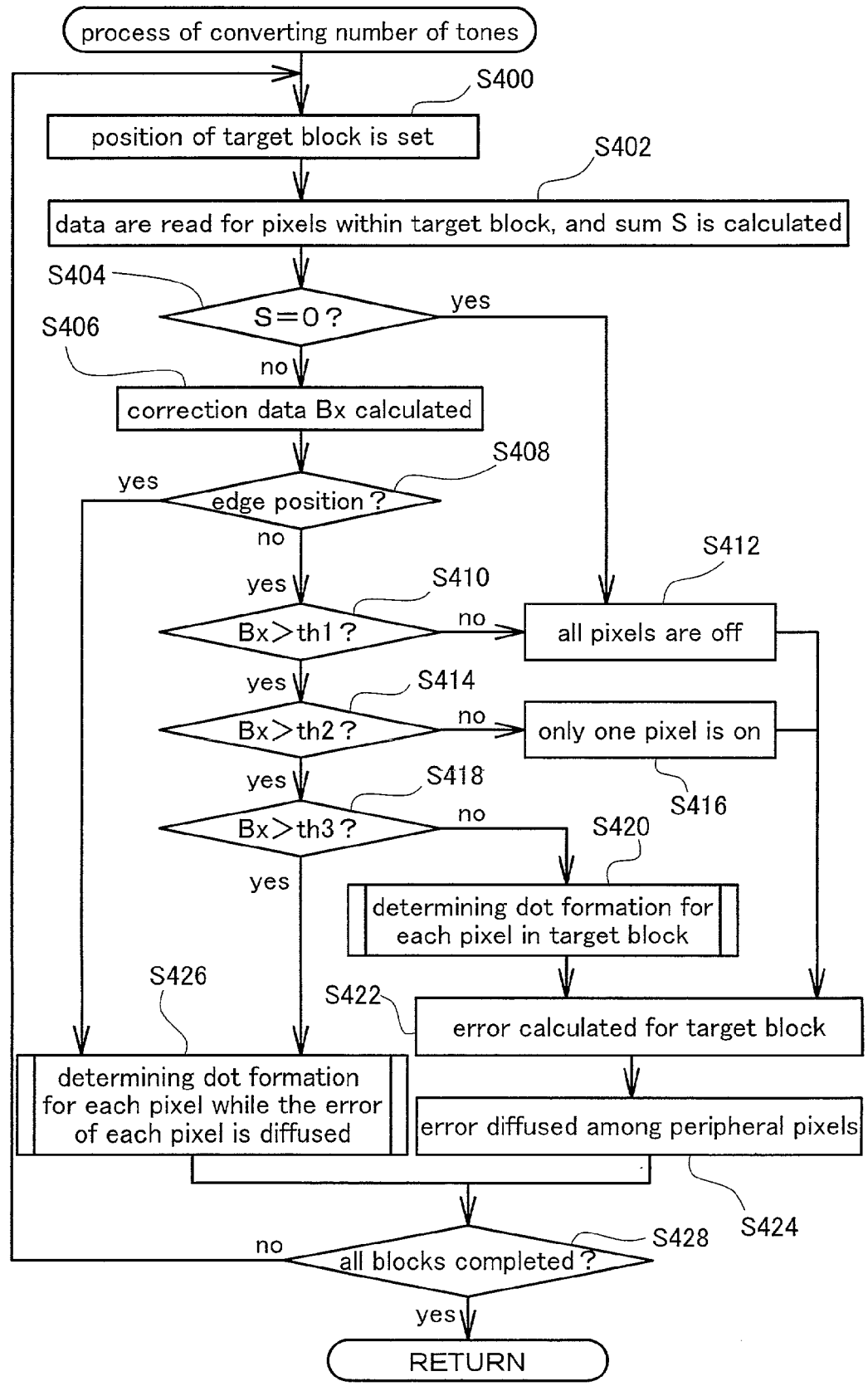
FIG. 19 is a flow chart depicting the flow of processing in a second modification of the process of converting number of tones pertaining to the present embodiment.

FIG. 19 is a flow chart of a process in which the dot on-off state is determined using an appropriate method selected depending not only on the sum or correction data of a target block but also on whether the target block is on or off an edge area. The section containing an added procedure (step S408) for determining whether the target block is located on an edge position differs significantly from the process of converting number of tones shown in FIG. 5. The process of converting number of tones of the second modification will now be outlined in accordance with the flow chart in FIG. 19, with emphasis on the portions that differ from the procedure shown in FIG. 5.

Similar to the process of converting number of tones described below with reference to FIG. 5, the process of converting number of tones of the second embodiment is performed such that a target block is first established (step S400), tone values and diffusion errors are read for the pixels within the block, and a sum S is calculated for the target block (step S402). It is then determined whether the sum S thus calculated is equal to zero (step S404), and it is concluded that no dots are formed in any of the pixels constituting the target block if the sum S is indeed equal to zero (step S412). Correction data Bx are calculated (step S406) if the sum S of the target block is not zero. The correction data Bx can be calculated using Eq. (2) in the same manner as in the case of the process of converting number of tones described above with reference to FIG. 5.

Figure 20A:
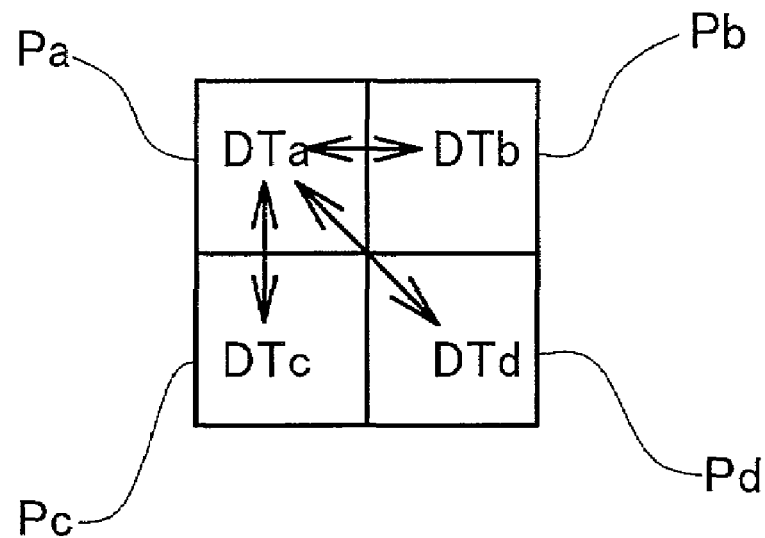
FIG. 20 is a diagram schematically showing the edge detection method used in the second modification of the process of converting number of tones pertaining to the present embodiment.

It is then determined whether the position set for the target block is on or off the edge area (step S408). The presence of the target block on or off the edge area can be established by comparing the tone values of adjacent pixels in the target block. It is possible to conclude that the target block is off the edge area if the pixel Pa and the difference between the tone values of the pixels Pa and Pb, Pa and Pc, or Pa and Pd is no more than a specific value, as shown, for example, in FIG. 20a. Specifically, it is possible to conclude that the position selected for the target block is not located on the edge area of an image if the following is true.

$abs(DTa-DTb)<th$edge, and $abs(DTa-DTc)<th$edge, and $abs(DTa-DTd)<th$edge  (3), where abs(X) is a function for determining the absolute value of X, and the threshold value thedge is preset to an appropriate level. The arrows between the pixel Pa and the pixels Pb, Pc, and Pd in FIG. 20a indicate whether an edge has been found to exist on the basis of the difference between the tone values of the pixels in question.

Figure 20B:
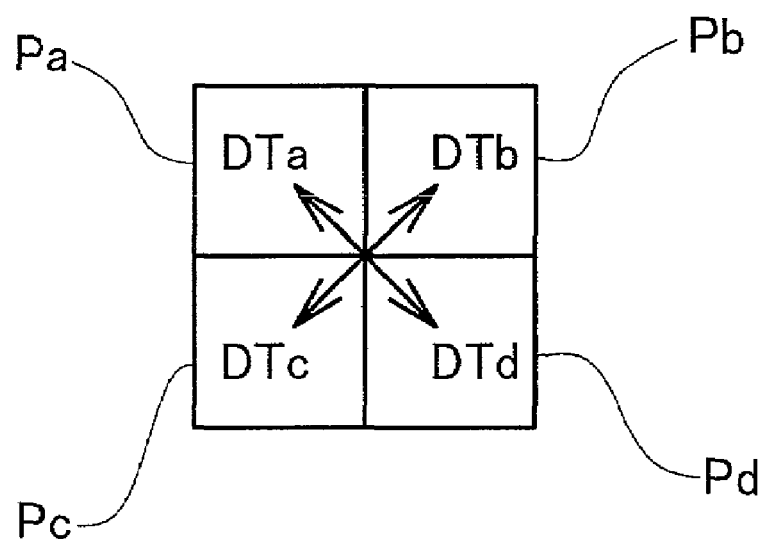

The following simple procedure may be used instead of the procedure involving Eq. (3) above in order to determine whether the target block is located on an edge area or not. Specifically, it can be concluded that the position of the target block is located on the edge area if the difference between the tone values of the pixels Pa and Pd or the pixels Pb and Pc is no more than a specific value, as shown in FIG. 20b. Alternatively, it can be concluded that the target block is located on the edge area if the difference between the highest and lowest tone values of the pixels constituting the target block is found to be greater than a specific threshold value.

The same process of converting number of tones as the one described with reference to FIG. 5 is performed if it is concluded that the target block is not located on the edge area ("no" in step S408). Specifically, the correction data Bx of the target block are compared with specific threshold values th1, th2, and th3 (steps S410, S414, and S418), the dot on-off state is determined (steps S412, S416, and S420) by a specific method in accordance with the corresponding values of the correction data Bx for the target block, and the tone errors generated by the entire target block are diffused among peripheral pixels (steps S422 and S424). The dot on-off state is determined for each pixel while the tone errors generated by the pixels are diffused among undetermined peripheral pixels if the values of the correction data Bx for the target block exceed the threshold value th3 (step S426).

If it is concluded that the target block is located on the edge area of an image ("yes" in step S408 of FIG. 19), the dot on-off state is determined for each pixel while the error of the pixel is diffused among undetermined peripheral pixels irrespective of the value of the correction data Bx (step S426). Adopting this approach allows image data resolution to be preserved because the dot on-off state is always determined for the pixels corresponding to the edge area of the image. This approach is therefore preferred because the process of converting number of tones can be rapidly performed without blurring image outlines.

Various embodiments were described above, but the present invention is not limited by the above-described embodiments and can be implemented in a variety of embodiments as long as the essence thereof is not compromised.

For example, the above embodiments were described with reference to cases in which the description was simplified by assuming that only two states were possible for the pixels: one in which a dot was formed and one in which no dots were formed. It is obvious, however, that this concept can also be adapted to printers capable of forming dots having various sizes, or to printers capable of forming multiple dot types having various ink densities. The process of converting number of tones of the above-described embodiments can be favorably adapted to printers because such procedures tend to become more complicated and time-consuming with an increase in the types of dots that can be formed.

The software program (application program) for performing the above-described functions may be executed after being downloaded via a communications line into the main memory or external memory device of a computer system. It is apparent that software programs stored on CD-ROMs or flexible disks can also be read and executed.

Although the above embodiments were described with reference to a case in which an image data conversion procedure (containing a process of converting number of tones) was executed by a computer, it is also possible to adopt an arrangement in which part or all of the image data conversion procedure is executed by a printer or a dedicated image-processing apparatus.

Finally, the image display apparatus is not necessarily limited to a printing device for printing images by forming ink dots on a print medium and may, for example, be a liquid-crystal display device for displaying images with continuously varying tone values by diffusing bright spots on the surface of a liquid-crystal display with an appropriate density.

What is claimed is:

1. An image-processing apparatus that determines dot on-off state for each pixel by taking into account a tone value of the pixel, and converts image data expressed by the tone value of each pixel into a specific expression format based on the dot on-off state, said image-processing apparatus comprising:
 a block formation unit that combines a specific number of adjacent pixels, out of the pixels forming the image, into blocks, and identifies the block which includes the pixel for which the dot on-off state is to be formed as a target block;
 a processing condition determination unit that detects the tone value of the each pixel included in the target block, and determines whether or not the target block satisfies a specific processing condition based on the detected magnitude of the tone values of respective pixels;
 a first image data conversion unit that converts the image data of each pixel included in the target block into the specific expression format based on the dot on-off state, in block units, when the processing condition determination unit determines that the target block satisfies the specific processing condition;
 a second image data conversion unit that converts the image data, with respect to each pixel included in the target block, into the specific expression format, when the processing condition determination unit determines that the target block does not satisfy the specific processing condition; and
 an error diffusion unit that diffuses tone errors, which arise due to the image data conversion, among unconverted pixels located peripherally of the converted pixel.

2. An image-processing apparatus in accordance with claim 1,
 wherein said image-processing apparatus uses the first image data conversion unit to convert the image data in block units if a sum of the tone values of the pixels included in the target block is less than a specific threshold value, and uses the second image data conversion unit to convert the image data in pixel units if the sum of the tone values of the pixels included in the target block is more than a specific threshold value.

3. An image-processing apparatus in accordance with claim 2, wherein said calculation unit calculates the tone value obtained by diffusing the tone errors.

4. An image-processing apparatus in accordance with claim 1, wherein said processing condition determination unit confirms that the target block does not satisfy the specific processing condition if there are pixels for which the difference between the tone values of two adjacent pixels exceeds a specific value in the target block.

5. An image-processing apparatus in accordance with claim 1, wherein said processing condition determination unit confirms that the target block does not satisfy the specific processing condition if the difference between the maximum and minimum tone values of pixels exceeds a specific value in the target block.

6. An image-processing apparatus in accordance with claim 1, wherein said first image data conversion unit performs said conversion by determining dot on-off states for the whole pixels included in the target block, and
said error diffusion unit diffuses the tone errors, which arise in each converted pixel due to the image data conversion, among the unconverted pixels of a block adjacent to the target block.

7. An image-processing apparatus in accordance with claim 6, wherein said first image data conversion unit calculates a sum of tone values for all the pixels of the target block, and converts the image data by forming dots for pixels whose number is specified in accordance with the sum.

8. An image-processing apparatus in accordance with claim 7, wherein said first image conversion unit converts the image data by forming dots for pixels at specific locations in the target block in accordance with the sum.

9. An image-processing apparatus in accordance with claim 7, wherein said first image conversion unit converts the image data by forming dots for the specified number of pixels in order from the pixels with larger tone values in the target block.

10. An image-processing apparatus in accordance with claim 7, wherein said first image conversion unit selects, in block units, the specified number of positions of pixels, where dots are to be formed for, and converts the image data by forming dots for the pixels associated with the selected positions.

11. An image-processing apparatus in accordance with claim 7, wherein said first image conversion unit converts the image data by not forming any dot for the pixels of the target block if the sum is less than a specific value.

12. An image-processing apparatus in accordance with claim 6, wherein said error diffusion unit further comprises:
a diffused error initialization unit that, when the sum obtained by totaling the tone values of the pixels included in a target block without taking into account the diffused tone errors is equal to zero in a plurality of consecutive target blocks, initializes tone errors diffused to a following target block in the plurality of consecutive target blocks.

13. An image-processing apparatus in accordance with claim 6, wherein said first image conversion unit further comprises a summated error diffusion unit that calculates the summated error, which is obtained by totaling the tone errors to be diffused into the pixels of the target block, and diffuses the resulting summated error among the pixels of the target block in accordance with a specific method.

14. An image-processing apparatus in accordance with claim 13, wherein said summated error diffusion unit diffuses the summated error among to pixels of the target block in a specific ratio.

15. An image-processing apparatus in accordance with claim 6, wherein said first image conversion unit further comprises a specific pixel diffusion unit that diffuses all the tone error to be diffused into the pixels of the target block into a pixel disposed at a specific location in the target block.

16. An image-processing apparatus in accordance with claim 6, wherein said first image conversion unit converts the image data by determining the dot on-off state for each pixel included in the target block, while diffuses the tone error arising in the each pixel of the target block within the unconverted adjacent pixels in the target block.

17. An image-processing apparatus in accordance with claim 1, wherein said error diffusion unit further comprises a block error calculation unit that calculates a block error which is obtained by totaling the tone errors arising in the pixels of the target block due to converting the image data, and
said error diffusion unit diffuses the resulting block error into the unconverted pixel included in a block adjacent to the target block.

18. An image-processing apparatus in accordance with claim 17, wherein said block error calculation unit calculates the block error based on results of the determination of dot on-off state for the pixels of the target block and based on a sum of tone values of each pixel included in the target block prior to the diffusion of the tone errors from the adjacent block.

19. An image-processing apparatus in accordance with claim 17, wherein said error diffusion unit diffuses the block error in a specific ratio into the pixel included in a block adjacent to the target block.

20. An image-processing apparatus in accordance with claim 17, wherein said error diffusion unit diffuses the block error into the pixel disposed at specific locations in the target block.

21. An image-processing apparatus in accordance with claim 1, wherein said block formation unit combines four pixels arranged in two rows and columns into a block.

22. A print control apparatus that determines dot on-off state for each pixel by taking into account a tone value of to pixel, and converts image data expressed by the tone value of each pixel into a print data which is described by a specific expression format based ante dot on-off state, and said apparatus controls a print unit which forms ink dots on a print medium so as to print an image by the output of the print data, said image-processing apparatus comprising:
a block formation unit that combines a specific number of adjacent pixels, out of the pixels forming the image, into blocks, and identifies the block which includes the pixel for which the dot on-off state is to be formed as a target block;
a processing condition determination unit that detects the tone value of the each pixel included in the target block, and determines whether or not the target block satisfies a specific processing condition based on the detected magnitude of the tone values of respective pixels;
a first image data conversion unit that converts the image data of each pixel included in the target block into the print data described by the specific expression format based on the dot on-off state, in block units, when the processing condition determination unit determines that the target block satisfies the specific processing condition;
a second image data conversion unit that converts the image data, with respect to each pixel included in the target blocks, into the print data described by the specific expression format, when to processing condition determination unit determines that the target block does not satisfy the specific processing condition;

an error diffusion unit that diffuses tone errors, which arise due to the image data conversion, among unconverted pixels located peripherally of the converted pixel; and a print data output unit that outputs the print data obtained by said first image data conversion unit and said second image data conversion unit to the print unit.

23. A print control apparatus in accordance with claim 22, wherein said processing condition determination unit confirms that the target block does not satisfy the specific processing condition if the difference between the maximum and minimum tone values of pixels exceeds a specific value in the target block.

24. A print control apparatus in accordance with claim 22, wherein said error diffusion unit further comprises a block error calculation unit that calculates a block error which is obtained by totaling the tone errors arising in the pixels of the target block due to converting the image data, and said error diffusion unit diffuses the resulting block error into the unconverted pixel included in a block adjacent to the target block.

25. An image-processing method that determines dot on-off state for each pixel by taking into account a tone value of the pixel, and converts image data expressed by the tone value of each pixel into a specific expression format based on the dot on-off state, said image-processing method comprising:

a step of combining a specific number of adjacent pixels, out of the pixels forming the image, into blocks;

a step of identifying the block which includes the pixel for which the dot on-off state is to be formed as a target block;

a step of detecting the tone value of the each pixel included in the target block;

a step of converting the image data of each pixel included in the target block into the specific expression format based on the dot on-off state, in block units, when the target block satisfies a specific processing condition based on the detected tone values;

a step of converting to image data, with respect to each pixel included in the target block, into the specific expression format, when the target block dose not satisfy the specific processing condition based on the detected tone values; and a step of diffusing tone errors, which arise due to converting the image data, among unconverted pixels located peripherally of the converted pixel.

26. An image-processing method in accordance with claim 25, wherein the target block is confirmed to satisfy the specific processing condition when the difference between the maximum and minimum tone valves of pixels exceeds a specific value in the target block.

27. An image-processing method in accordance with claim 25, wherein the method further comprises a step of calculating a block error which is obtained by totaling the tone errors arising in the pixels of the target block due to converting the image data, and said step of diffusing tone error is a step of diffusing the resulting block error into the unconverted pixel included in a block adjacent to the target block.

28. A recording medium in which a program is recorded in a computer readable manner, said program actualizing a method that determines dot on-off state for each pixel by taking into account a tone value of the pixel, and converts image data expressed by the tone value of each pixel into a specific expression format based on the dot on-off state, said program causes a computer to execute:

a function of combining a specific number of adjacent pixels, out of the pixels forming the image, into blocks;

a function of identifying the block which includes the pixel for which the dot on-off state is to be formed as a target block;

a function of detecting the tone value of the each pixel included in the target block;

a function of converting the image data of each pixel included in the target block into the specific expression format based on the dot on-off state, in block units, when the target block satisfies a specific processing condition based on the detected tone values;

a function of converting the image data, with respect to each pixel included in the target block, into the specific expression format, when the target block dose not satisfy the specific processing condition based on the detected tone values; and a function of diffusing tone errors, which arise due to converting the image data, among unconverted pixels located peripherally of the converted pixel.

29. A recording medium in accordance with claim 28, wherein the target block is confirmed to satisfy the specific processing condition when the difference between the maximum and minimum tone values of pixels exceeds a specific value in the target block.

30. A recording medium in accordance wit claim 28, wherein said program further causes a function of calculating a block error which is obtained by totaling the tone errors arising in the pixels of the target block due to converting the image data, and said function of diffusing tone error is a function of diffusing the resulting block error into the unconverted pixel included in a block adjacent to the target block.

31. A program for actualizing a method that determines dot on-off state for each pixel by taking into account a tone value of the pixel, and converts image data expressed by the tone value of each pixel into a specific expression format based on the dot on-off state, said program causes a computer to execute:

a function of combining a specific number of adjacent pixels, out of the pixels forming the image, into blocks;

a function of identifying the block which includes the pixel for which the dot on-off state is to be formed as a target block;

a function of detecting the tone value of the each pixel included in the target block;

a function of converting the image data of each pixel included in the target block into the specific expression format based on the dot on-off state, in block units, when the target block satisfies a specific processing condition based on the detected tone values;

a function of converting the image data, with respect to each pixel included in the target block, into the specific expression format, when the target block dose not satisfy the specific processing condition based on the detected tone values; and a function of diffusing tone errors, which a rise due to converting the image data, among unconverted pixels located peripherally of the converted pixel.

32. A program in accordance with claim 31, wherein the target block is confirmed to satisfy the specific processing condition when the difference between the maximum and minimum tone values of pixels exceeds a specific value in the target block.

33. A program in accordance with claim 31, wherein said program further causes a function of calculating a block error which is obtained by totaling the tone errors arising in the pixels of the target block due to converting the image data, and said function of diffusing tone error is a function of diffusing the resulting block error into the unconverted pixel included in a block adjacent to the target block.

* * * * *